(12) United States Patent
Randle et al.

(10) Patent No.: US 11,397,108 B2
(45) Date of Patent: Jul. 26, 2022

(54) MULTI-FUNCTION CONTROLLER AND METHOD OF USING SAME

(71) Applicant: Marquardt Mechatronik GmbH, Rietheim-Weilheim (DE)

(72) Inventors: Matthew R. Randle, Cazenovia, NY (US); Kenneth L. Markowski, Cazenovia, NY (US); Andrea Burke, Cazenovia, NY (US); David J. Fassett, Cazenovia, NY (US)

(73) Assignee: Marquardt GmbH, Rietheim-Weilheim (DE)

(*) Notice: Subject to any disclaimer, the term of this patent is extended or adjusted under 35 U.S.C. 154(b) by 1027 days.

(21) Appl. No.: 15/183,233

(22) Filed: Jun. 15, 2016

(65) Prior Publication Data

US 2016/0370821 A1    Dec. 22, 2016

Related U.S. Application Data

(60) Provisional application No. 62/255,730, filed on Nov. 16, 2015, provisional application No. 62/180,282, filed on Jun. 16, 2015.

(51) Int. Cl.
*G06F 3/033* (2013.01)
*G01J 1/44* (2006.01)
*G01D 5/14* (2006.01)
*G01J 1/04* (2006.01)
*G05G 25/04* (2006.01)
(Continued)

(52) U.S. Cl.
CPC .............. *G01J 1/44* (2013.01); *G01D 5/145* (2013.01); *G01J 1/0219* (2013.01);
(Continued)

(58) Field of Classification Search
CPC ...... G06F 3/033; G06F 3/0304; G06F 3/0312; G06F 3/0362; G06F 3/0338;
(Continued)

(56) References Cited

U.S. PATENT DOCUMENTS 5,453,728 A    9/1995  Zimmermann et al.
6,100,822 A    8/2000  Liu
(Continued)

FOREIGN PATENT DOCUMENTS

CN           101443870        5/2009
DE     10 2013 008 972       12/2013
(Continued)

OTHER PUBLICATIONS

U.S. Appl. No. 15/346,041, filed Nov. 8, 2016, Savage et al.

*Primary Examiner* — Sahlu Okebato
*Assistant Examiner* — Jeffrey Parker
(74) *Attorney, Agent, or Firm* — Burr & Brown, PLLC

(57) ABSTRACT

A multi-function controller, comprising a control element, a support element, at least a first light emitter and at least a first light receiver. A multi-function controller, comprising a control element, at least a first magnet and at least a first sensor. In some aspects, one or more occluders is provided. In some aspects, a control element is rotatable and/or tiltable, and/or the control element can be pushed or pulled, and movement of the control element is detected optically or by Hall effect sensors. In some aspects, an icon cap is not rotatable. A method comprising rotating and/or tilting a control element on a multi-function controller, and detecting a position of the control element.

27 Claims, 16 Drawing Sheets

(51) Int. Cl.
*G01J 1/02* (2006.01)
*G01J 1/06* (2006.01)
*G05G 9/047* (2006.01)
*G01J 1/42* (2006.01)
*F21Y 115/10* (2016.01)

(52) U.S. Cl.
CPC ........... *G01J 1/0228* (2013.01); *G01J 1/0233* (2013.01); *G01J 1/0271* (2013.01); *G01J 1/0403* (2013.01); *G01J 1/0448* (2013.01); *G01J 1/06* (2013.01); *G01J 1/42* (2013.01); *G05G 9/04792* (2013.01); *G05G 9/04796* (2013.01); *G05G 25/04* (2013.01); *F21Y 2115/10* (2016.08); *G01J 2001/061* (2013.01); *G05G 2009/04777* (2013.01); *G05G 2009/04781* (2013.01)

(58) Field of Classification Search
CPC ........... H01H 25/008; H01H 2019/146; G06K 7/10603; H03K 17/78; H03K 17/941; H03K 17/968; G01D 5/34; G01D 5/145; A63F 13/06; G01J 1/44; G01J 1/0219; G01J 1/0228; G01J 1/0233; G01J 1/0271; G01J 1/0403; G01J 1/0448; G01J 1/06; G01J 1/42; G01J 2001/061; G05G 9/04792; G05G 9/04796; G05G 25/04; G05G 2009/04777; G05G 2009/04781; F21Y 2115/10
See application file for complete search history.

(56) References Cited

U.S. PATENT DOCUMENTS

| | | | |
|---|---|---|---|
| 6,275,173 B1 * | 8/2001 | Wu | H01H 25/008 250/231.13 |
| 7,015,688 B2 | 3/2006 | Wolber et al. | |
| 7,034,523 B2 | 4/2006 | Fahrländer et al. | |
| 7,714,272 B2 | 5/2010 | Urabe | |
| 8,186,240 B2 | 5/2012 | Sakai et al. | |
| 8,909,489 B2 | 12/2014 | Saruki et al. | |
| 9,121,694 B2 | 9/2015 | Mori et al. | |
| 2009/0084214 A1 * | 4/2009 | Sakai | A43C 15/04 74/471 XY |
| 2010/0171704 A1 * | 7/2010 | Senft | G01D 5/34 345/168 |
| 2010/0200375 A1 * | 8/2010 | Han | B62D 1/046 200/61.54 |
| 2011/0101209 A1 * | 5/2011 | Benner, Jr. | G01D 5/3473 250/231.16 |
| 2016/0061636 A1 * | 3/2016 | Gowreesunker | G01D 5/3473 250/205 |

FOREIGN PATENT DOCUMENTS

| | | |
|---|---|---|
| EP | 2856485 | 4/2015 |
| KR | 20140080771 | 7/2014 |
| KR | 20140095622 | 8/2014 |
| WO | 2013/178357 | 12/2013 |

* cited by examiner

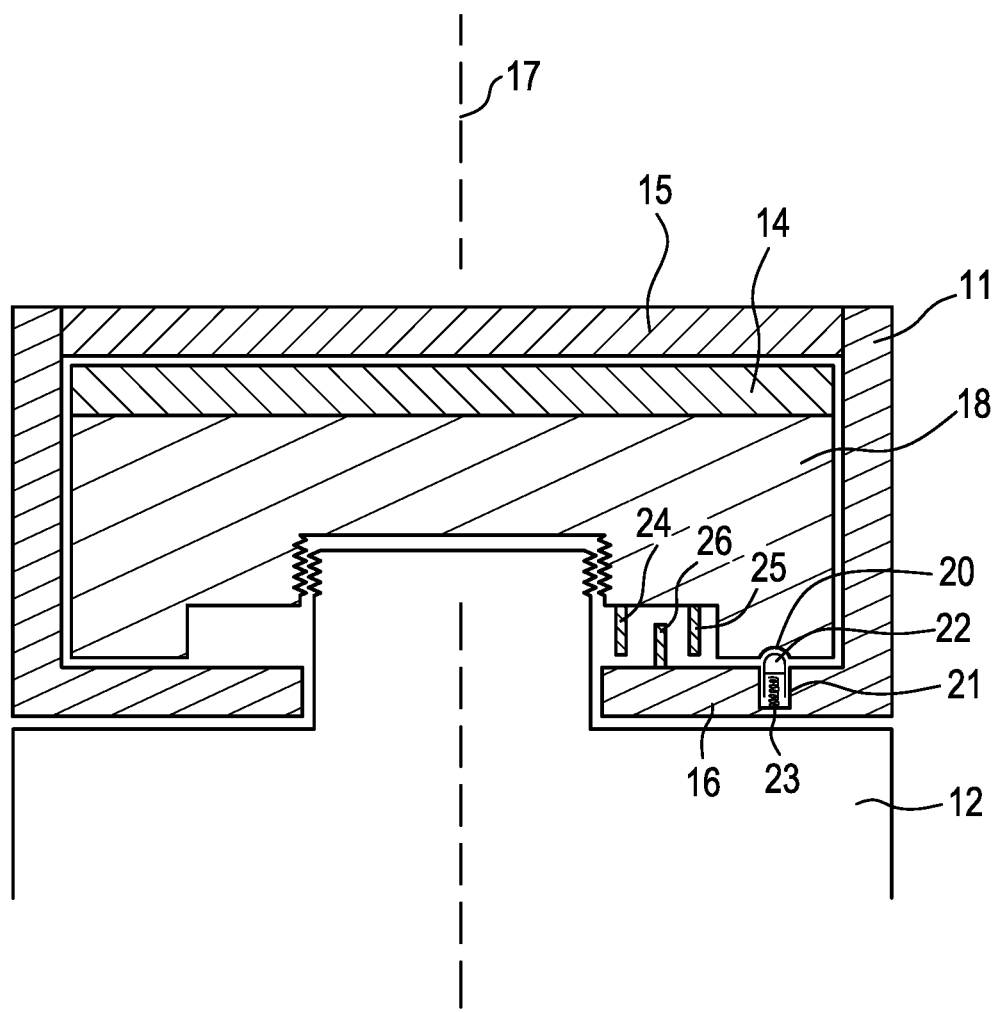

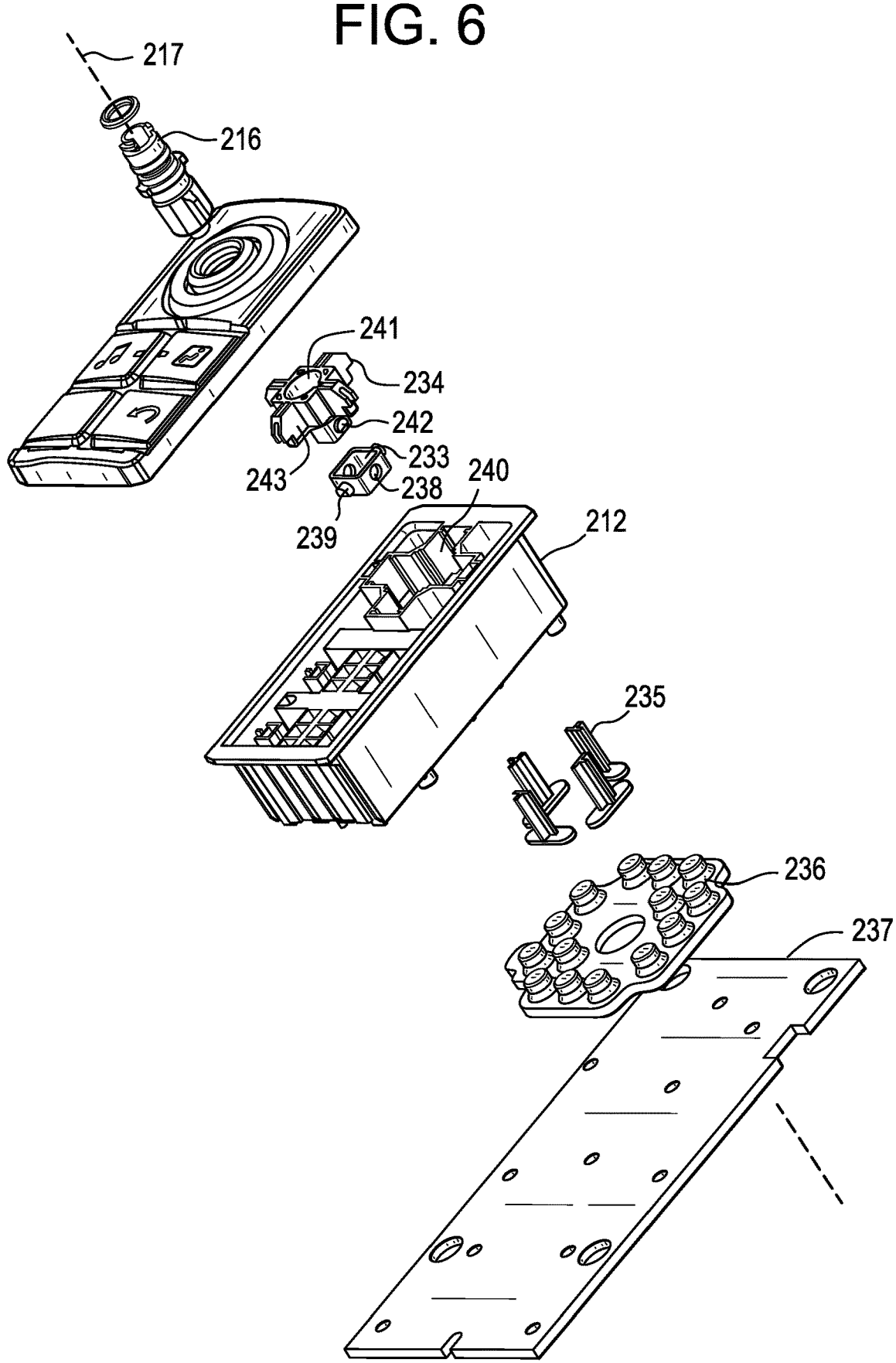

MULTI-FUNCTION CONTROLLER AND METHOD OF USING SAME

CROSS-REFERENCE TO RELATED APPLICATIONS

This application claims the benefit under 35 U.S.C. 119 section (e) of U.S. Provisional Patent Application No. 62/180,282, filed Jun. 16, 2015, the entirety of which is incorporated herein by reference.

This application claims the benefit under 35 U.S.C. 119 section (e) of U.S. Provisional Patent Application No. 62/255,730, filed Nov. 16, 2015, the entirety of which is incorporated herein by reference.

FIELD OF THE INVENTIVE SUBJECT MATTER

In one aspect, the present inventive subject matter is directed to a multi-function controller. The multi-function controllers in accordance with the present inventive subject matter can be integrated into a wide variety of systems, e.g., heavy industrial equipment, systems (e.g., vehicles) for industrial off-road (non-automotive) environments, construction equipment, etc. In some aspects, the multi-function controllers can be operated to control one or more components or sub-systems in the systems in which the multi-function controllers are integrated. The present inventive subject matter also provides methods of controlling systems, including methods that comprise using one or more multi-function controllers in accordance with the present inventive subject matter. Among the capabilities that are provided by various embodiments in accordance with the present inventive subject matter are resistance (and/or complete tolerance) to water, mechanical shock, electrical shock, dust, dirt, temperature changes and combinations of such conditions and events.

BACKGROUND

Multi-function controllers are used with gaming systems and for some industrial applications including controlling the opening and closing of access points, such as swinging doors and sliding doors, and to control some remotely operated equipment. More recently, various types of controllers have been employed to navigate through pages of automobile navigation systems installed in passenger cars and SUVs.

For example, the I-drive system currently used in some BMW automobiles uses a turn knob controller and a display screen to control a majority of the secondary vehicle systems.

BRIEF SUMMARY OF THE INVENTIVE SUBJECT MATTER

In one aspect, the present inventive subject matter is directed to a multi-function controller that is designed as a sealed unit that is suitable for use in harsh industrial environments, such as construction, agriculture, forestry and material handling, and is also suitable for off-road vehicle applications.

As noted above, in one aspect, the present inventive subject matter is directed to a multi-function controller which can be integrated into any of a wide variety of systems. Representative examples of systems in which the multi-function controllers in accordance with the present inventive subject matter can be integrated include heavy industrial equipment, systems (e.g., vehicles) for industrial off-road (non-automotive) environments, construction equipment, forestry equipment, material handling equipment, as well as automobiles, boats, all-terrain vehicles, etc. In some aspects of the present inventive subject matter, there are provided multi-function controllers that can satisfy a wide variety of capabilities so that they are suitable for being integrated into any of a wide variety of systems. The present inventive subject matter is not limited to components for integration in any particular systems, i.e., the multi-function controllers in accordance with the present inventive subject matter can be integrated into any desired system, and can be coupled with or used with any desired component or components.

As will be apparent from the discussion that follows, among the capabilities that are provided by various embodiments in accordance with the present inventive subject matter are resistance (and/or complete tolerance) to water, mechanical shock, electrical shock, dust, dirt, temperature changes, vibrations, and combinations of such conditions and events. In some embodiments in accordance with the present inventive subject matter, there are provided multi-function controllers that are compact, reliable, precise, durable, accurate, made of parts that are simple to manufacture, easy to assemble, easy to operate, and that provide the capability to generate a wide variety of commands.

Some embodiments in accordance with the present inventive subject matter provide a multi-function controller that has a handle element that can be manipulated, namely, (1) rotated clockwise or counterclockwise among a number of absolute positions and/or any number of increments, (2) tilted in any of a number of directions any of a number of times and/or for any selected duration, and/or (3) pushed in or pulled out any of a number of times and/or for any selected duration to generate signals that can be used to control any of a wide variety of functions, in any of a wide variety of ways, in a system in which the multi-function controller is integrated.

Some embodiments in accordance with the present inventive subject matter provide a multi-function controller that comprises one or more pushbuttons, a viewing screen and a control element, in which a pushbutton (or a sequence of pushbuttons) can be pressed to select a menu (which then appears on the viewing screen), and a single handle element can be manipulated, namely, (1) rotated clockwise or counterclockwise among a number of absolute positions and/or any number of increments, (2) tilted in any of a number of directions any of a number of times and/or for any selected duration, and/or (3) pushed in or pulled out any of a number of times and/or for any selected duration to generate signals to cause corresponding movement of the control element in order to control any of a wide variety of functions, in any of a wide variety of ways, in a system in which the multi-function controller is integrated. In some of such embodiments, pressing a pushbutton causes a menu to be displayed on the viewing screen, tilting of the handle element in any direction causes a cursor on the viewing screen to make a corresponding movement within the viewing screen (whereby the cursor can be moved to images on the viewing screen that represent a particular function), and pushing the handle element inward causes the function represented by that image on which the cursor is located to be carried out.

In accordance with a first aspect of the present inventive subject matter, there is provided a multi-function controller, comprising:
 a control element,
 a support element,
 at least a first light emitter, and
 at least a first light receiver,
 the control element rotatable relative to a first axis among at least first and second rotational positions,
 the first light emitter and the first light receiver configured such that:
  if the control element is in the first rotational position and the first light emitter emits light of a first brightness, the first light receiver receives a first percentage of the light emitted by the first light emitter,
  if the control element is in the second rotational position and the first light emitter emits light of the first brightness, the first light receiver receives a second percentage of the light emitted by the first light emitter, the second percentage of light different from the first percentage of light.

In accordance with a second aspect of the present inventive subject matter, there is provided a multi-function controller, comprising:
 a handle element,
 a control element,
 an icon cap,
 a plurality of gears, and
 at least a first sensor,
 the handle element rotatable relative to a first axis among at least two rotational positions,
 the plurality of gears configured such that rotation of the handle element relative to the first axis causes the control element to rotate and does not cause the icon cap to rotate,
 the first sensor configured to detect a rotational position of the control element and/or to detect incremental rotational movement of the control element.

In accordance with a third aspect of the present inventive subject matter, there is provided a multi-function controller, comprising:
 a control element,
 at least a first magnet, and
 at least a first sensor,
 the control element rotatable relative to a first axis among at least two rotational positions,
 the control element tiltable relative to the first axis among at least two tilt orientations,
 one of the first magnet and the first sensor connected to the control element, the other of the first magnet and the first sensor not connected to the control element,
 the first sensor configured to detect a rotational position of the control element and/or to detect incremental rotational movement of the control element, and
 the first sensor configured to detect a tilt orientation of the control element.

In accordance with a fourth aspect of the present inventive subject matter, there is provided a method, comprising:
 rotating and/or tilting a control element on a multi-function controller, the control element rotatable relative to a first axis among at least two rotational positions, and/or tiltable relative to the first axis among at least two tilt orientations, and
 detecting a position of the control element.

In accordance with another aspect of the present inventive subject matter, there is provided a multi-function controller, comprising:
 a control element.

In accordance with another aspect of the present inventive subject matter, there is provided a multi-function controller, comprising a support element, at least a first light emitter, and at least a first light receiver.

In accordance with another aspect of the present inventive subject matter, there is provided a multi-function controller, comprising an icon cap.

In accordance with another aspect of the present inventive subject matter, there is provided a multi-function controller, comprising at least a first magnet, and at least a first sensor.

The inventive subject matter may be more fully understood with reference to the accompanying drawings and the following detailed description of the inventive subject matter.

BRIEF DESCRIPTION OF THE DRAWING FIGURES

FIG. 2 is a cross-sectional view of components in the first embodiment of a multi-function controller.

FIG. 6 is a plan view of components in some embodiments of a multi-function controller in accordance with the present inventive subject matter.

Figure 8:
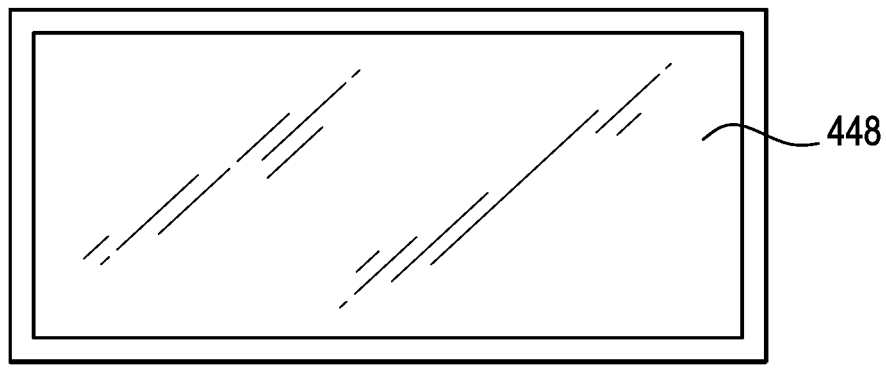

FIG. 8 schematically depicts a representative example of a viewing screen that can be incorporated in or interfaced with a multi-function controller in accordance with the present inventive subject matter.

Figure 9:
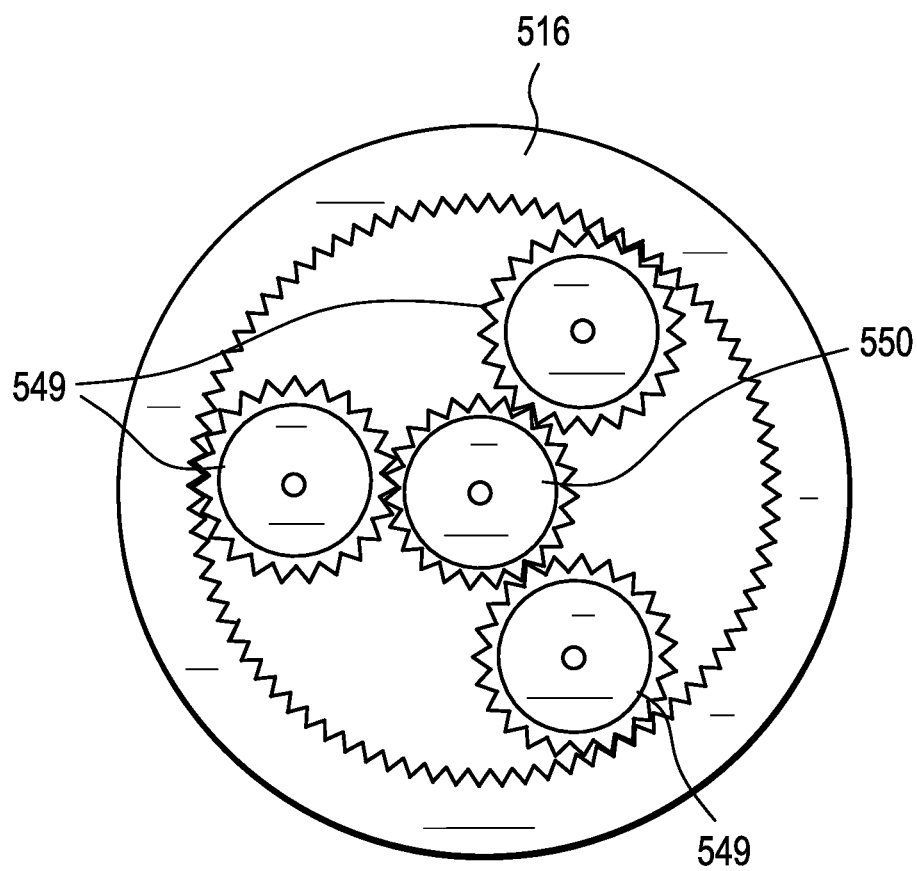

FIG. 9 is a schematic view of components that can be included in a planetary gear arrangement in some embodiments in accordance with the present inventive subject matter.

Figure 10:
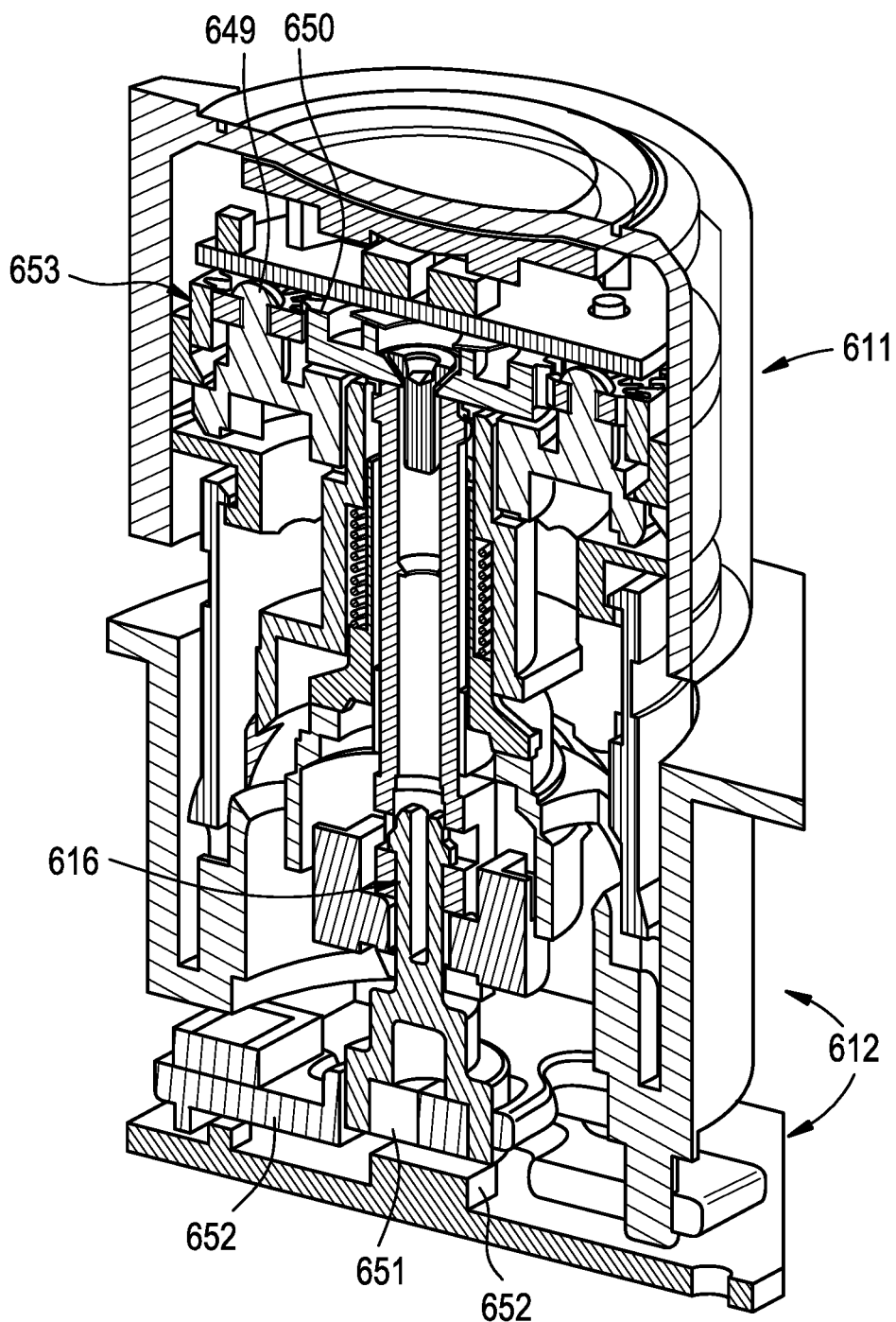

FIG. 10 is a cross-sectional view of components in some embodiments of a multi-function controller in accordance with the present inventive subject matter.

Figure 11:
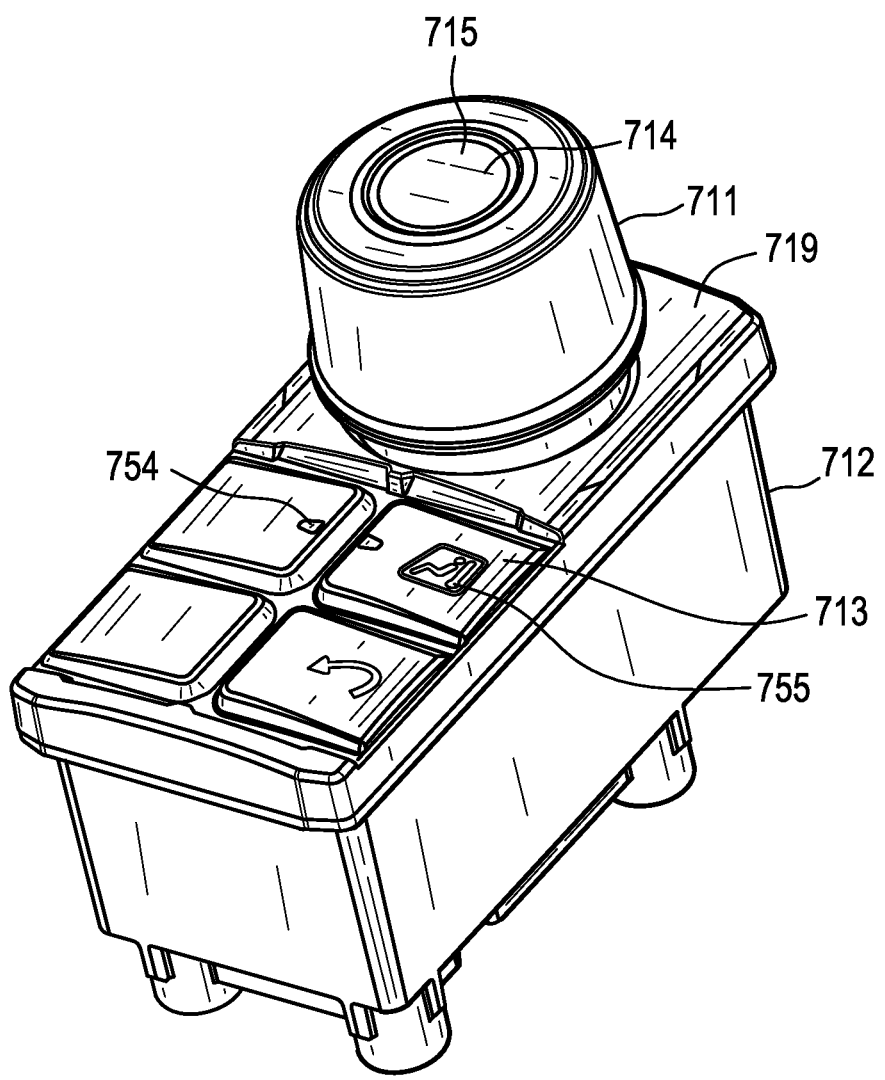

FIG. 11 is a perspective view of another embodiment of a multi-function controller in accordance with the present inventive subject matter.

Figure 12:
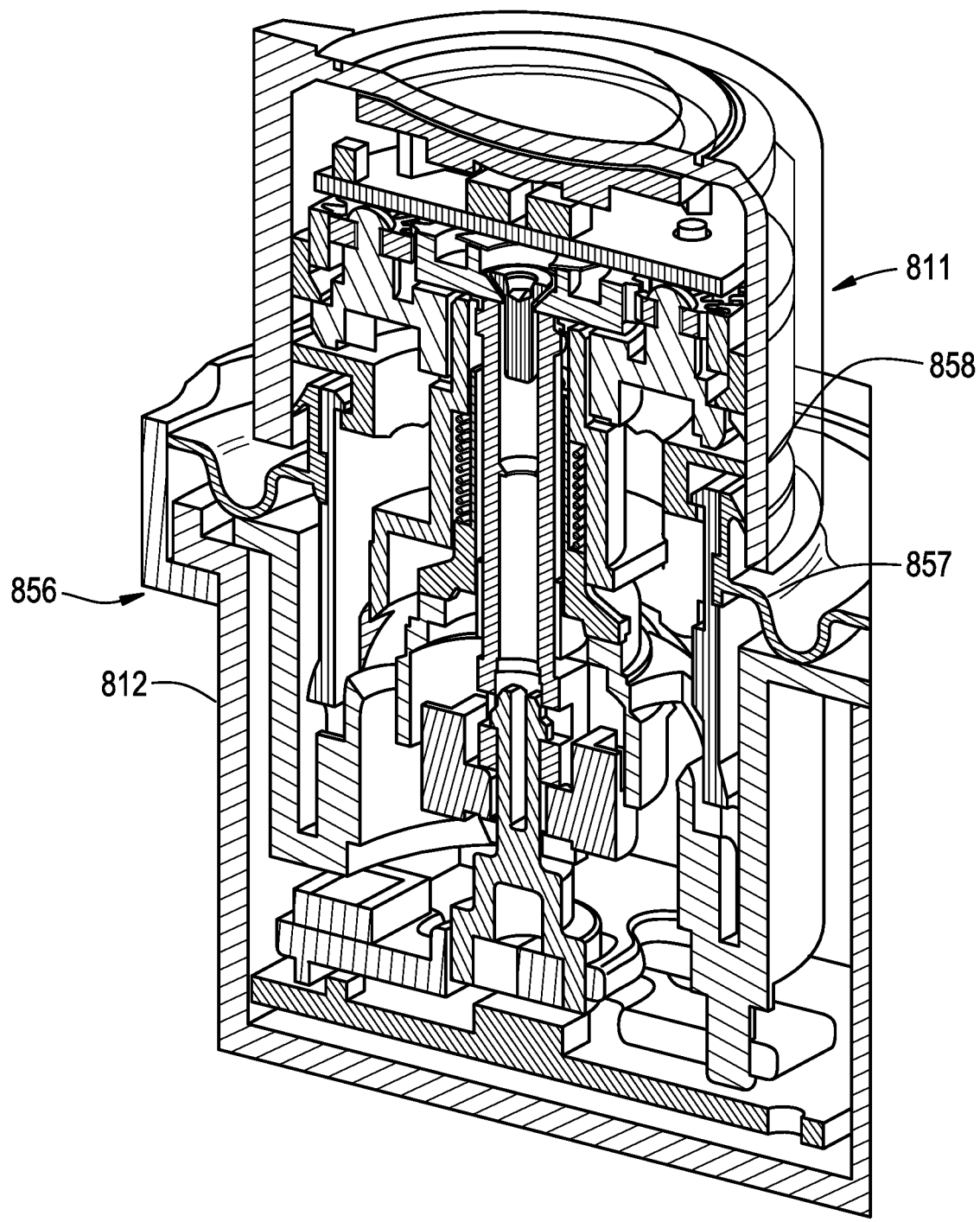

FIG. 12 depicts representative components of a sealed multi-function controller in accordance with the present inventive subject matter.

Figure 13:
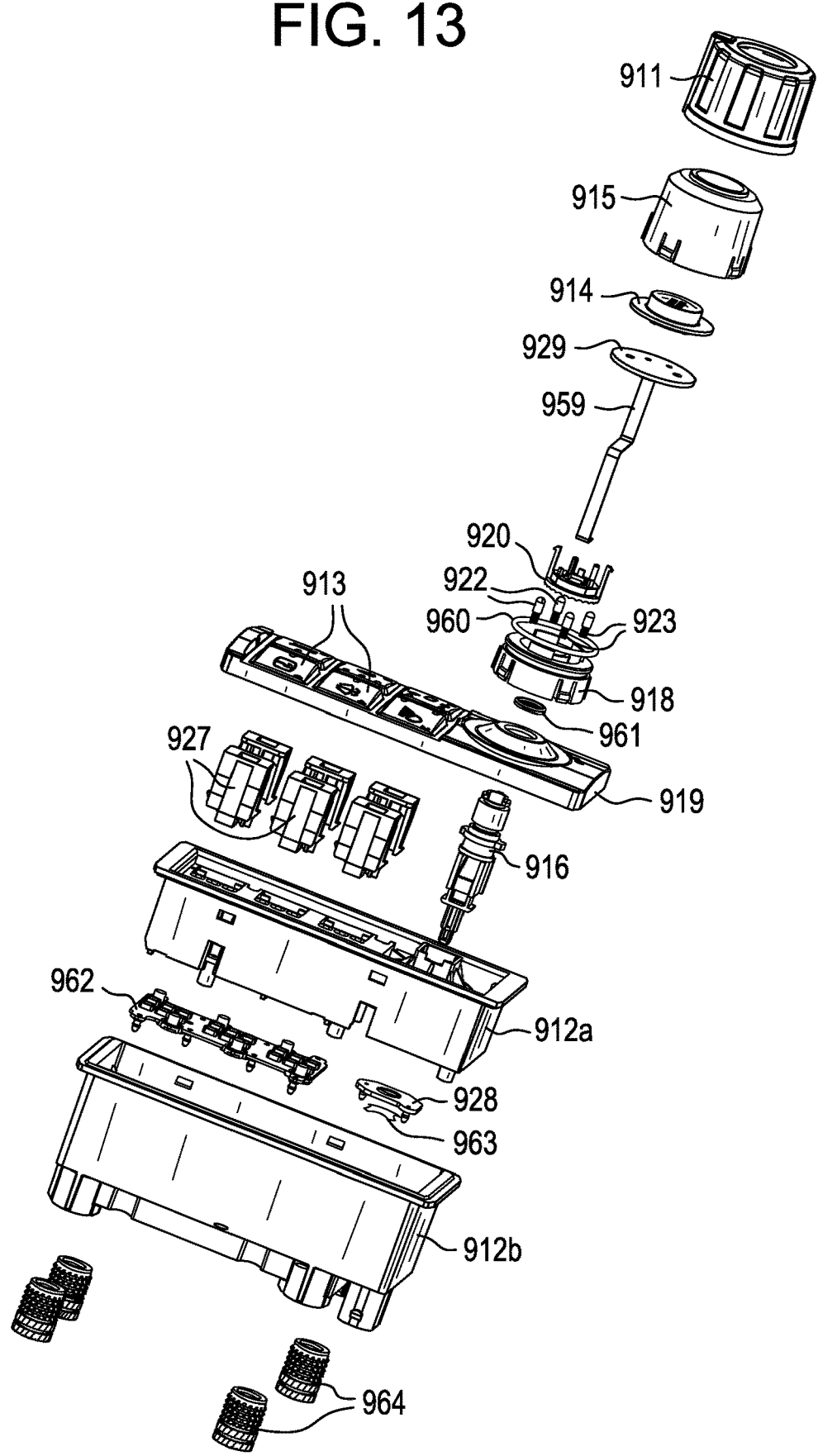

FIG. 13 is an exploded view of components of another embodiment of a multi-function controller in accordance with the present inventive subject matter.

Figure 14:
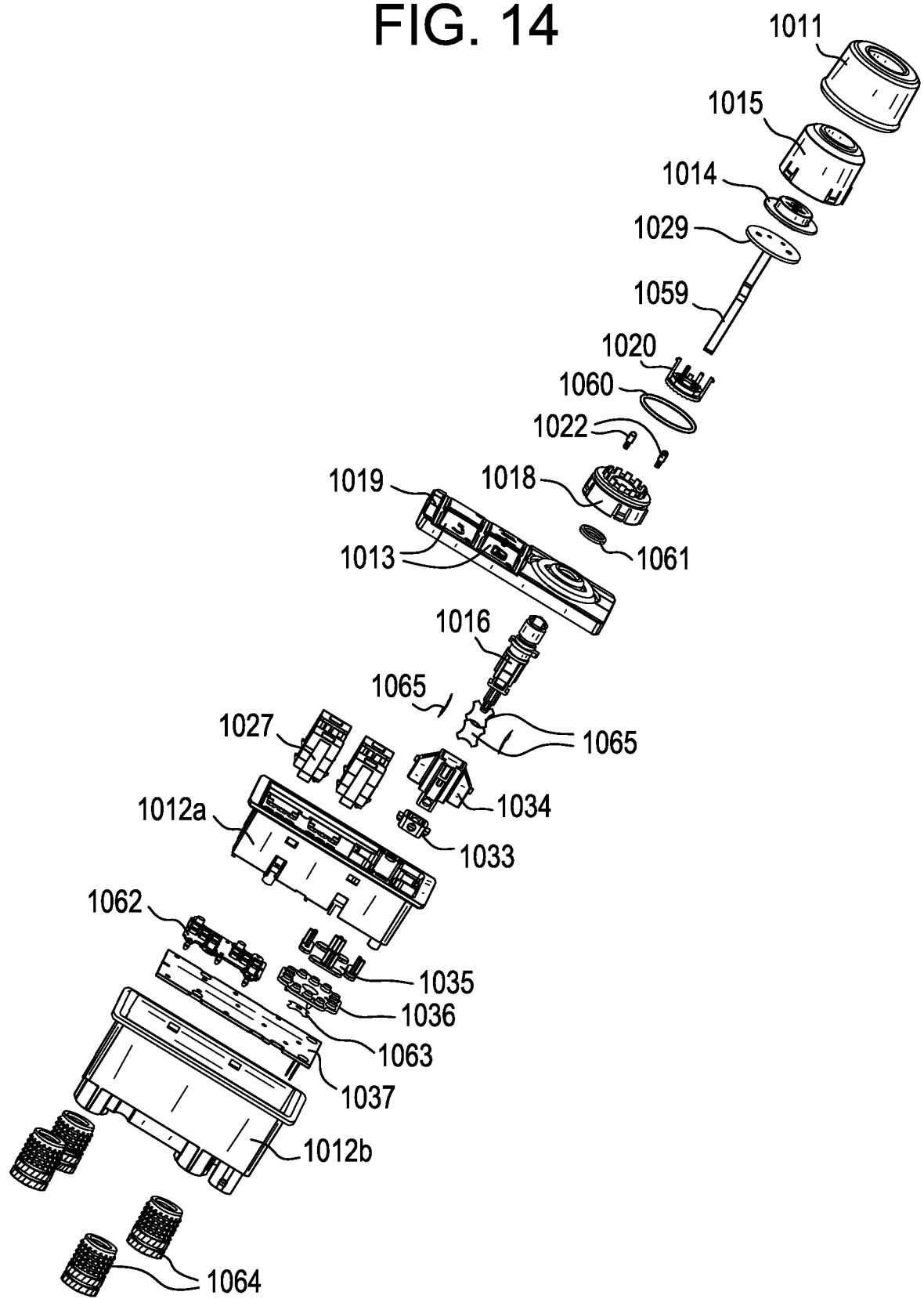

FIG. 14 is an exploded view of components of another embodiment of a multi-function controller in accordance with the present inventive subject matter.

DETAILED DESCRIPTION OF THE INVENTIVE SUBJECT MATTER

The present inventive subject matter now will be described more fully hereinafter with reference to the accompanying drawings, in which embodiments of the inventive subject matter are shown. This inventive subject matter should not be construed as being limited to the embodiments set forth herein. Rather, these embodiments are provided so that this disclosure will be thorough and complete, and will fully convey the scope of the inventive subject matter to those skilled in the art.

As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "lower", "bottom", "below", "upper", "top", "above," "horizontal" or "vertical" may be used herein to describe one element's relationship to another element (or to other elements), e.g., as illustrated in the Figures. Such relative terms are intended to encompass different orientations of the device in addition to the orientation depicted in the Figures and/or as described herein. For example, if a device is turned over, elements described as being on the "lower" side of other elements would then be oriented on "upper" sides of the other elements. The exemplary term "lower" can therefore encompass both an orientation of "lower" and "upper," depending on the particular orientation. Similarly, if a device is turned over, elements described as "below" or "beneath" other elements would then be oriented "above" the other elements. The exemplary terms "below" or "beneath" can therefore encompass both an orientation of above and below.

As noted above, in some aspects, the present inventive subject matter is directed to a multi-function controller that comprises one or more pushbuttons, and/or that has a handle element that can be manipulated, namely, (1) rotated clockwise or counterclockwise among a number of absolute positions and/or any number of increments, (2) tilted in any of a number of directions any of a number of times and/or for any selected duration, and/or (3) pushed in or pulled out any of a number of times and/or for any selected duration to generate signals that can be used to control any of a wide variety of functions, in any of a wide variety of ways, in a system in which the multi-function controller is integrated. As also noted above, multi-function controllers in accordance with the present inventive subject matter can be integrated into a wide variety of systems, representative examples including heavy industrial equipment, systems (e.g., vehicles) for industrial off-road (non-automotive) environments, construction equipment, forestry equipment, material handling equipment, as well as automobiles, boats, all-terrain vehicles, etc. Among the capabilities that are provided by various embodiments in accordance with the present inventive subject matter are resistance (and/or complete tolerance) to water, mechanical shock, electrical shock, dust, dirt, temperature changes, vibrations, and combinations of such conditions and events, and the present inventive subject matter provides multi-function controllers that are compact, reliable, precise, durable, accurate, made of parts that are simple to manufacture, easy to assemble, easy to operate, easy to repair (including replacing components when necessary), and/or provide the capability to generate a wide variety of commands.

The expression "the control element rotatable relative to a first axis, the control element tiltable relative to the first axis," as used herein, means that the control element can be rotated relative to a first axis by applying a small force (that will not damage or fracture the control element or any component functionally connected to the control element), whereby the control element can rotate between (or among) two or more rotational positions, and the control element can be tilted (from at least one of its rotational positions) by applying a small force (that will likewise not damage or fracture the control element or any component functionally connected to the control element), from one "tilt orientation" to one or more other "tilt orientations", whereby an imaginary line segment (the imaginary line segment connecting first and second points on the control element) extends along the first axis when the control element is in one tilt orientation, and moves to an orientation where it is not aligned with the first axis when the control element is moved to a different tilt orientation. For example, in a representative embodiment in which the control element comprises a first region that is a shaft that has a shaft axis, from the perspective of a user looking down on the control element with a line of vision extending along the shaft axis, the shaft is rotatable clockwise and counter-clockwise among 24 rotational positions (each spaced 15 degrees from its nearest neighbor on either side), and the near end of the shaft can be tilted in any of four directions (up, down, right or left), i.e., from an upright tilt orientation to any of four other tilt orientations) from the above-mentioned perspective of a user.

The expression "connected", as used herein (e.g., in the expression "the first magnet is connected to the control element" or "the first sensor connected to the control element") means that the first structure which is "connected" to a second structure can be in contact with the second structure, or can be separated from the second structure by one or more intervening structures, and that movement of the second structure will cause the first structure to move.

The expression "not connected", as used herein (e.g., in the expression "the first magnet is not connected to the control element" or "the first sensor not connected to the control element") means the first structure (which is "not connected" to a second structure) is not directly attached to the second structure, and is not indirectly attached to the second structure via one or more intervening structures, such that movement of the second structure (to which the first structure is "not connected") will not cause movement of the first structure (or any movement of the first structure will be significantly less than the movement of the second structure.

The expression "light emitter is substantially aligned", as used herein (e.g., in the expression "the first light emitter is substantially aligned with the first light receiver") means that the light emitter (which is "substantially aligned" with a light receiver) is oriented relative to the light receiver such that (at the distance that the light receiver is spaced from the light emitter) the point (or points) that receive the greatest magnitude of brightness of light emitted from the light emitter is (or are) on the light receiver.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

Embodiments in accordance with the present inventive subject matter are described herein in detail in order to provide exact features of representative embodiments that are within the overall scope of the present inventive subject matter. The present inventive subject matter should not be understood to be limited to such detail.

Embodiments in accordance with the present inventive subject matter are also described with reference to cross-sectional illustrations that are schematic illustrations of idealized embodiments of the present inventive subject matter. As such, variations from the shapes of the illustrations as a result, for example, of manufacturing techniques and/or tolerances, are to be expected. Embodiments of the present inventive subject matter should not be construed as being limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

Figure 1:
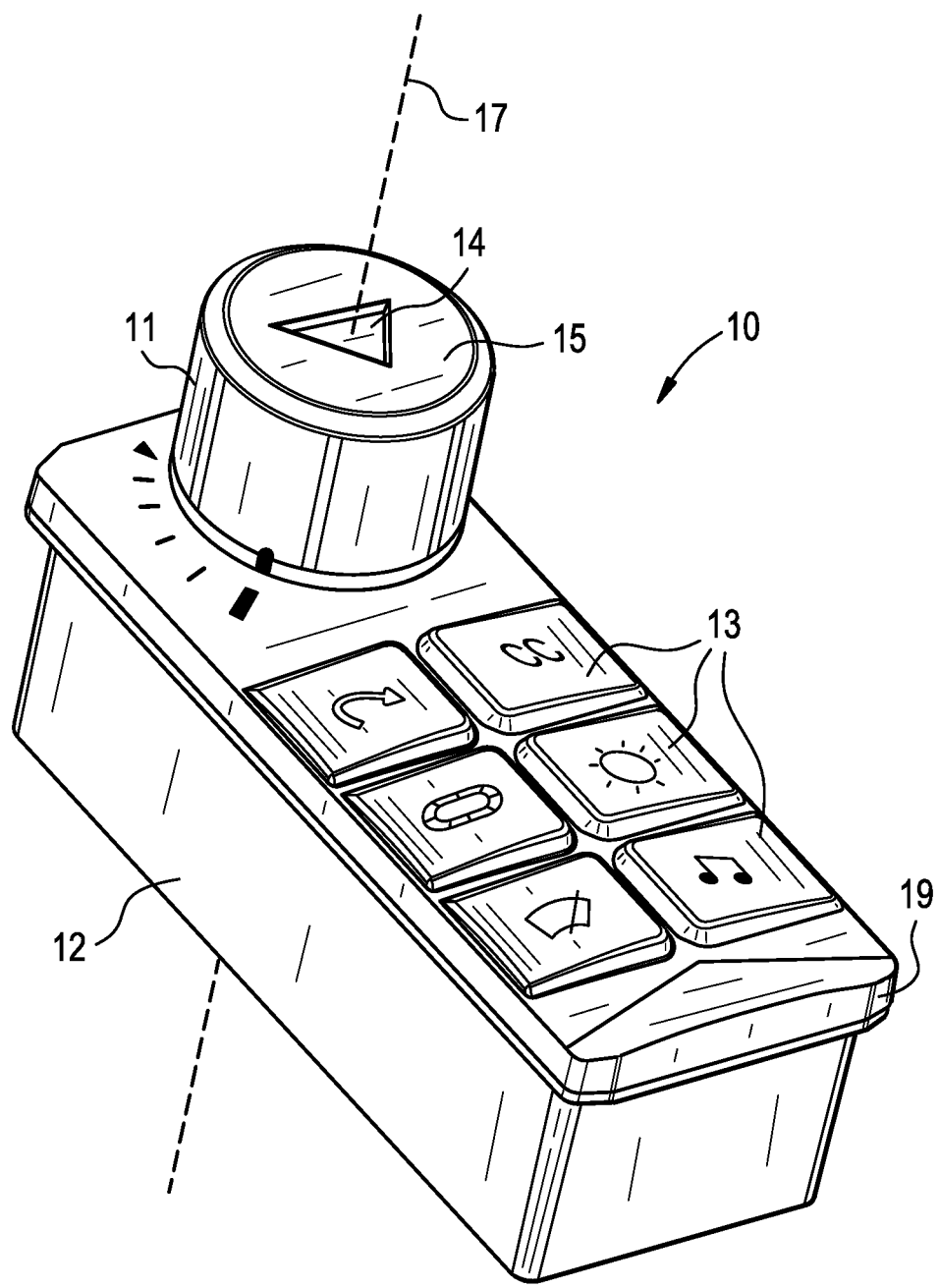
FIG. 1 is a perspective view of a first embodiment of a multi-function controller in accordance with the present inventive subject matter.

A first embodiment of a multi-function controller in accordance with the present inventive subject matter is depicted in FIGS. 1-4. FIG. 1 depicts a multi-function controller 10 that comprises a handle element 11 (in the form of a control knob), a housing 12, a first flexible mat 19 that comprises six pushbuttons 13 (each optionally having indicia that indicate a function or functions accessed by pressing each respective pushbutton 13) and an icon cap 14 which is viewable through a transparent lens 15 in an inner region of the handle element 11.

Figure 3A:
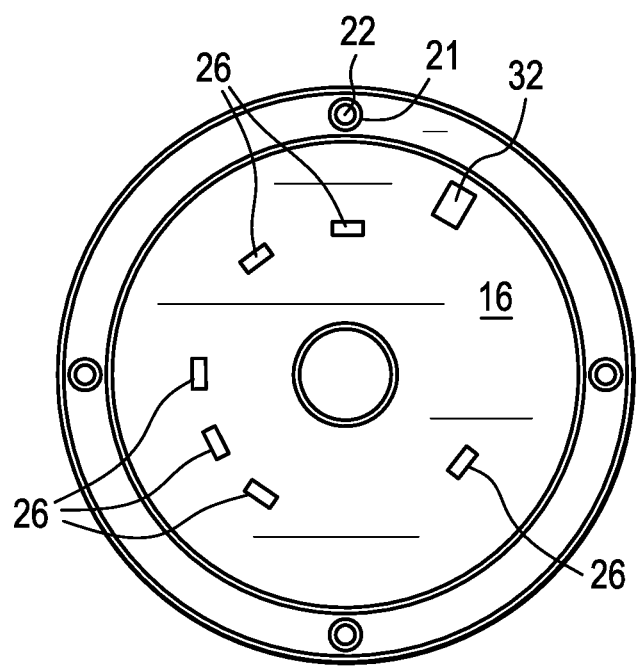
FIGS. 3A and 3B are plan views of components in the first embodiment of a multi-function controller.
Figure 3B:
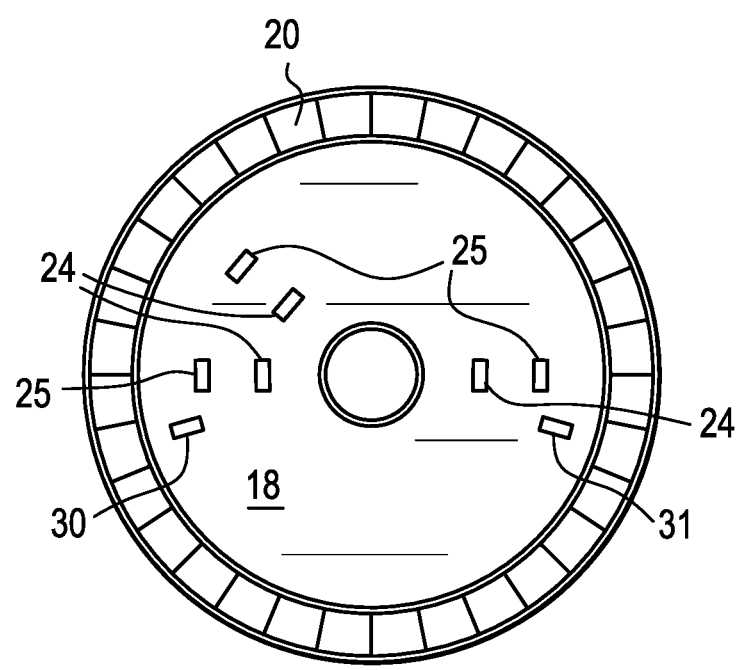

FIGS. 2, 3A and 3B schematically depict a control element 16, and components (1) that allow for the control element 16 to be caused to rotate incrementally relative to an imaginary first axis 17 (and relative to the housing 12) by moving the handle element 11 relative to the first axis, (2) that allow for the rotational position of the control element 16 to be detected, (3) that allow for the control element 16 to be moved axially along the first axis 17, and (4) that allow for movement of the control element 16 along the first axis 17 to be detected.

FIG. 2 shows the control element 16, the first axis 17, a support element 18 and the icon cap 14. The support element 18 is rigidly connected to the housing 12, and the handle element 11 is rigidly connected to the control element 16. The control element 16 is free to rotate relative to the first axis 17 and relative to the support element 18 to any rotational position between a first rotational limit and a second rotational limit. FIG. 3A depicts the top (in the orientation depicted in FIG. 2) surface of the control element 16, and FIG. 3B depicts the bottom (in the orientation depicted in FIG. 2) surface of the support element 18. FIG. 3B shows a first stop element 30 (on the support element 18) and a second stop element 31 (also on the support element 18) and FIG. 3A shows a stop element-engaging structure 32 (on the control element 16). As is evident from FIGS. 3A and 3B, the first rotational limit is reached when the stop element-engaging structure 32 comes into contact with the first stop element 30, and the second rotational limit is reached when the stop element-engaging structure 32 comes into contact with the second stop element 31.

The underside (in the orientation depicted in FIG. 2) of the support element 18 has a plurality of detents 20, and the surface of the control element 16 that faces the detents 20 has a plurality of bores 21, in each of which is positioned a detent engaging element 22 which is biased upward (in the orientation depicted in FIG. 2) by a spring 23, whereby each detent engaging element 22 extends into a respective detent 20 if the control element 16 is rotated to one of its incremental rotational positions. Accordingly, a user who is rotating the handle element 11 can readily feel when the control element 16 reaches or is in one of its incremental rotational positions, and such user can readily feel each incremental rotational movement (e.g., the user can readily rotate the handle element 11 to rotate the control element 16 by a single rotational movement or by any desired number of rotational movements). In addition, as shown in FIG. 1, a mark can be provided on a control knob and a series of indicia can be provided on a housing (or vice-versa), with each of the indicia representing a selection (e.g., magnitude of a characteristic, frequency of an operation, etc.) such that in each rotational position, the indicia with which the mark aligns is the selected setting.

Connected to the underside (in the orientation depicted in FIG. 2) of the support element 18 are three light emitter/light receiver pairs, each light emitter/light receiver pair comprising a light emitter 24 and a light receiver 25. Connected to a portion of the control element 16 that faces the underside (in the orientation depicted in FIG. 2) of the support element 18 are a plurality of occluders 26 (only one of which is visible in FIG. 2). In the rotational position of the support element 18 depicted in FIG. 2, the occluder 26 visible in FIG. 2 is between the first light emitter 24 and the first light receiver 25, whereby most or all of the light emitted by the first light emitter 24 is not received by the first light receiver 25, such that in the rotational position of the control element 16 depicted in FIG. 2, a "0" signal (in a binary sense) is received for the first light emitter/receiver pair 24/25. If the control element 16 were rotated clockwise one rotational position (i.e., so that each detent engaging element 22 is moved to the adjacent clockwise detent, i.e., the detent engaging element 22 is moved from being received in a first detent 20 to another detent that is an immediate neighbor to the first detent 20 but one position away in the clockwise direction), the occluder 26 visible in FIG. 2 would be moved to a location where it is not between the first light emitter 24 and the first light receiver 25, and no other structure would block light emitted by the first light emitter 24 from reaching the first light receiver 25, whereby a "1" signal (in a binary sense) would be received for the first light emitter/receiver pair 24/25. If the support element 18 were rotated clockwise one additional rotational position, a different occluder 26 (FIG. 3A shows that there are a plurality of occluders 26 on the control element 16) would be between the first light emitter 24 and the first light receiver 25, and the signal from the first light emitter/receiver pair 24/25 would switch back to a "0" signal.

In each rotational position, each light emitter/light receiver pair 24/25 produces a "0" signal (if an occluder is between the light emitter and the light receiver in that light emitter/light receiver pair) or a "1" signal (if no occluder is between the light emitter and the light receiver in that light emitter/light receiver pair). By arranging the occluders relative to the three light emitter/light receiver pairs, up to eight different signal combinations can be generated for different rotational positions, i.e., first the first, second and third light emitter/light receiver pairs, combinations of respective signals of 0-0-0, 0-0-1, 0-1-0, 0-1-1, 1-0-0, 1-0-1, 1-1-0 and 1-1-1 can be generated at respective different rotational positions.

The icon cap 14 is connected to the upper (in the orientation depicted in FIG. 2) portion of the support element 18, and (as mentioned above) is visible through the transparent lens 15.

As is evident from FIG. 2, when the handle element 11 (and with it, the transparent lens 15, the support element 16, the bores 21, the detent engaging elements 22, the springs 23 and the occluders 26) is rotated about the first axis 17 relative to the housing 12 (and relative to the support element 18, the detents 20, the first light emitter 24 and the first light receiver 25), the icon cap 14 (connected to the support element 18) does not rotate.

As is also evident from FIG. 2, the handle element 11 can be pushed downward (in the orientation depicted in FIG. 2) to the point where an electronic signal is generated (e.g., a snap dome can be provided as in the embodiments depicted in FIGS. 13 and 14, whereby pushing the handle element 11 far enough causes the handle element 11 (and/or one or more other structures connected to the handle element 11) to come into contact with the snap dome and pushes the dome downward into contact with two or more electrically conductive regions on a circuit board), indicating that the handle element 11 is being pushed downward along the first axis 17.

In the embodiment depicted in FIGS. 1-4, or in any multi-function controller in accordance with the present inventive subject matter, optionally, one or more components (e.g., one or more springs, or a resilient collar) can be included to cause a control element (e.g., the control element 16) to return to its upright position when a force that caused the control element to be pushed down (or pulled up) is removed. For example, in the embodiment depicted in FIGS. 1-4, upon discontinuing application of downward (in the orientation depicted in FIG. 2) force to the handle element 11, the handle element 11 is pushed back to its upward (in the orientation depicted in FIG. 2) position, i.e., the position along the first axis 17 in which the handle element 11 is in FIG. 2 (e.g., in each of the embodiments depicted in FIGS. 13 and 14, the snap dome permits the handle element 11 to be pushed downward, and when the downward force is removed, the snap dome pushed the handle element 11 back up.

FIGS. 3A and 3B are plan views of components cross-sectionally depicted in FIG. 2.

Figure 4:
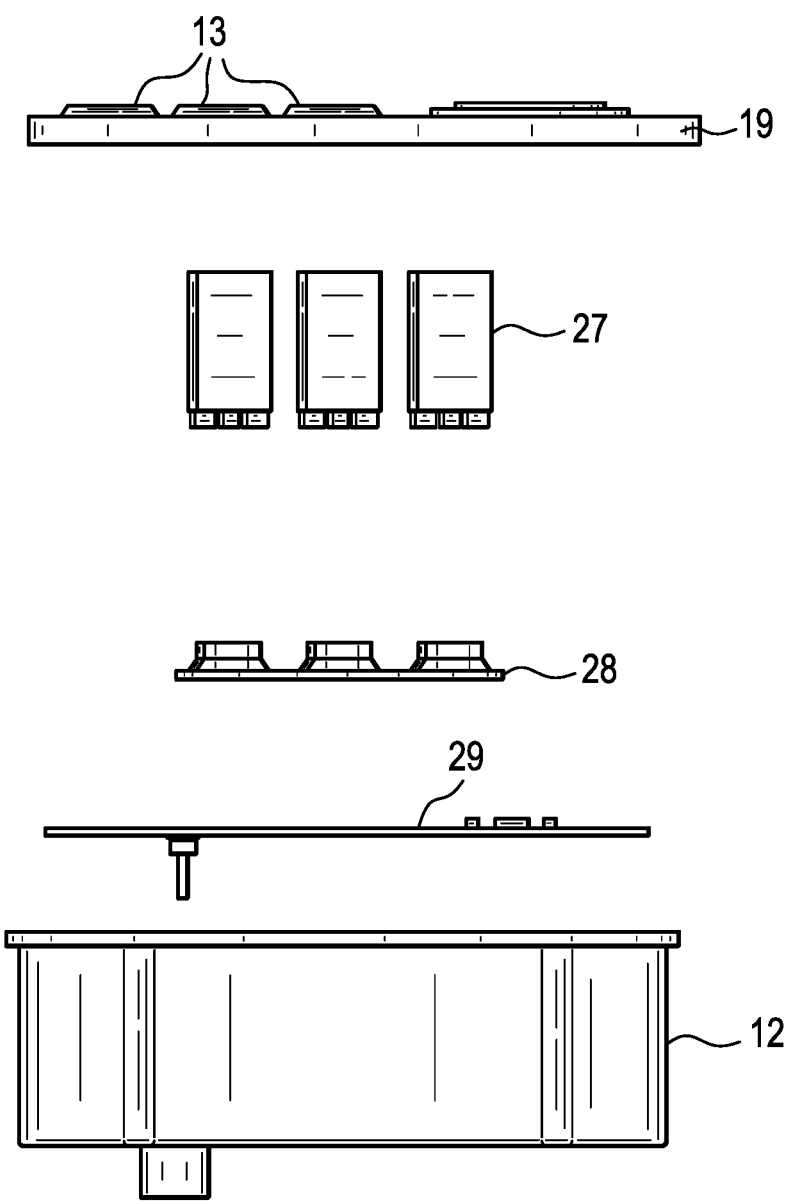
FIG. 4 is a perspective view of components in the first embodiment of a multi-function controller.

FIG. 4 is an exploded view showing components that are associated with the operation of the pushbuttons 13. The components depicted in FIG. 4 include the housing 12, a first flexible mat 19 (made, e.g., of a silicone polymer, e.g., a silicone rubber) which comprises the pushbuttons 13, keypad actuators 27 (one for each pushbutton 13), a second flexible mat 28 and a printed circuit board 29. Carbon pills are provided in the second flexible mat 28, whereby downward (in the orientation depicted in FIG. 4) force applied to any of the pushbuttons 13 causes downward movement of the corresponding keypad actuator and in turn downward movement of one or more corresponding carbon pill(s) which thereby contact the printed circuit board 29 and produce an electrically conductive bridge between at least two electrically conductive regions on the printed circuit board 29 to allow a signal to be generated that indicates that the pushbutton has been pressed.

The multi-function controller depicted in FIGS. 1-4 can be integrated into a system in any desired way, to allow signals generated by pressing of one or more pushbuttons 13 and/or movement of the handle element 11 in any of the ways (or combinations thereof) described above to affect the system in any desired way. For example, pressing each respective pushbutton 13 can access a corresponding menu (e.g., with the multi-function controller integrated into an excavator, a first pushbutton 13 can access a menu with options for operating tank treads (i.e., bands of track plates) on the excavator, a second pushbutton 13 can access a menu with options for operating various lighting systems on the excavator, a third pushbutton 13 can access a menu with options for operating wiper systems on the excavator, etc.). In other cases, sequences of pressing two or more pushbuttons 13 simultaneously or sequentially can access specific menus (i.e., with six pushbuttons, there are thirty-six possible different sequences of two pushbuttons or fifteen possible different combinations of two different pushbuttons).

As noted above, the handle element 11 can be rotated and/or pressed down. Rotation of the handle element 11 can create any desired signal. For example, rotation of the handle element 11 without pressing any pushbutton 13 can create a signal to the system to carry out a particular function, or rotation of the handle element and pressing a pushbutton (sequentially or simultaneously) can create a signal to the system to carry out a particular function. Each rotational position of the handle element 11 can create a unique signal (independent of the pressing of any pushbutton or based on the pressing of a particular pushbutton or combination of pushbuttons). Similarly pressing the handle element 11 downward (in the orientation depicted in FIG. 2) can create a signal to the system to perform any particular function.

In one specific representative integration of the multi-function controller 10 into a system, the multi-function controller 10 is operated by pressing a pushbutton 13, thereby accessing a particular menu, then the handle element 11 is rotated to a specific rotational position, and then the handle element 11 is pressed downward, thereby indicating that the user is selecting a function dictated by the rotational position of the handle element 11 within the menu previously accessed by pressing the specific pushbutton 13.

Various modifications can be made to the multi-function controller 10 depicted in FIGS. 1-4. For example, any desired pushbutton component or combination of components can be used in place of any component or combination of components to provide the pushbutton functions of the multi-function controller 10. The housing 12 can be of any desired shape. The handle element 11 can be any desired shape (e.g., octagonal, square, oblong, etc.) and the handle element 11 and the control element 16 can, if desired, together be a single piece. The axis about which the handle element 11 and the control element 16 rotate can be nearly perpendicular relative to the top surface of the first flexible mat 19, or it can be at any desired angle relative to the top surface of the first flexible mat 19. Any desired number of pushbuttons 13 can be provided, the pushbuttons 13 can be of any desired shape (and different pushbuttons can have different shapes), the pushbuttons 13 can be arranged in any desired way, and some or all of the pushbuttons 13 can be arranged on any surface or region of the housing 12. The icon cap 14 can be visible through a lens in the top of the handle element 11 or through one or more lenses or openings in any other surface or region of the handle element 11. The control element 16 can be of any desired shape. The support element 18 can be of any desired shape. Any number of detents 20 and detent engaging elements 22 can be provided, the detents 20 can be provided in a surface of the control element 16 (instead of in the support element 18) (and the detent engaging elements 22 provided in a surface of the support element 18 instead of in the control element 16), or any other suitable components or combination of components can be included for providing the user a feel for the rotational positions of the handle element 11. The first light emitter 24 and the first light receiver 25 can be connected to the control element 16 (instead of the support element 18) and the light occluders 26 can be connected to the support element 18 (instead of the control element 16). One or more light emitter(s) in a multi-function controller can emit light within a specific wavelength range (which may differ from a wavelength range in which one or more other light emitter(s) emits light, and/or one or more light receivers is sensitive to light within only a particular wavelength range, and/or different light receivers are sensitive only to light in different wavelength ranges. A multi-function controller could be made that does not include any occluders, and one or more light emitters and/or one or more light receivers is on one of the control element 16 or the support element 18, and one or more light emitters and/or light receivers is on the other of the control element 16 or the support element 18 such that rotation of the control element 16 relative to the support element 18 can be detected by the brightness and/or wavelength of light received by the light receiver or by each respective light receiver. The stop elements 30 and 31 and/or the stop element-engaging structure 32 can be eliminated so that the control element 16 can rotate relative to the support element 18 without any limit, and/or rotational positions can be provided at any desired rotational positions. Any desired number of light emitters, light receivers and occluders can be provided, and they can be positioned in any desired way to generate signals indicative of any rotational position or positions of the control element 16 relative to the support element 18. Any combination of such modifications can be made to the multi-function controller 10 depicted in FIGS. 1-4.

In the embodiment depicted in FIGS. 1-4, rotational movement of the control element 16 is detected as an absolute characteristic (i.e., the rotational position of the control element 16 is detected), but this embodiment (or any other embodiment) could instead be one in which the rotational movement of the control element is detected incrementally (i.e., rotational movement of the control element 16, and the direction of such movement, is detected), and any of the components described herein (e.g., in the description herein of a second embodiment in accordance with the present inventive subject matter) for providing incremental rotational detection can be employed.

Any or all pushbuttons (if included) in an multi-function controller as depicted in FIGS. 1-4 or in any multi-function controller in accordance with the present inventive subject matter can be programmable and can be re-programmed as desired, e.g., via a vehicle electronic control unit (ECU) bus, or a dedicated bus interface.

Figure 5A:
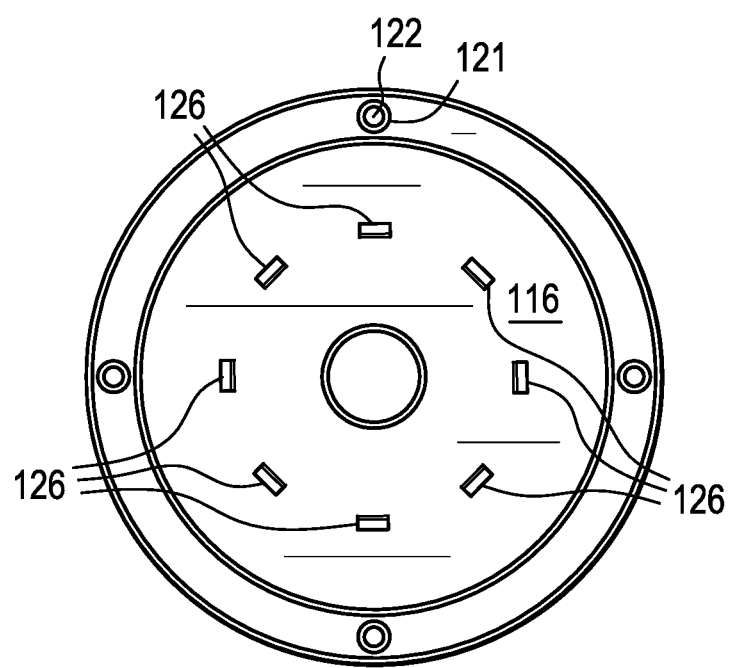
FIGS. 5A and 5B are plan views of components in some embodiments of a multi-function controller in accordance with the present inventive subject matter.
Figure 5B:
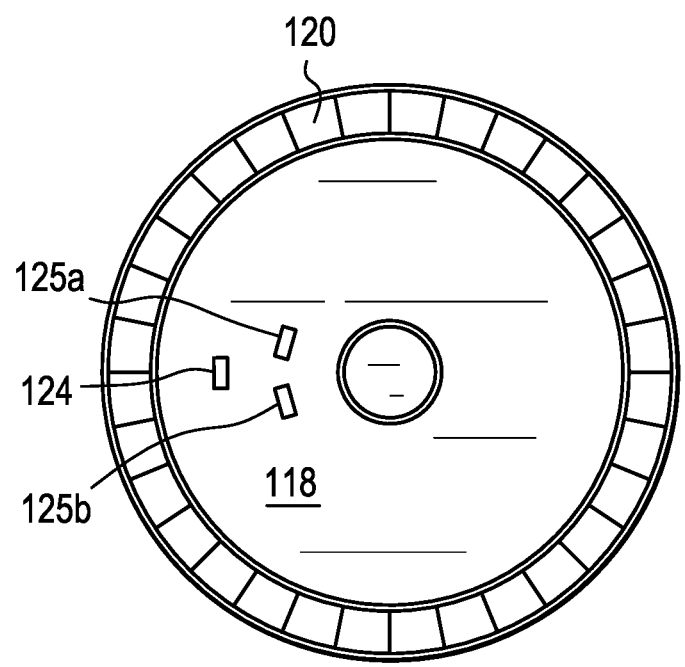

FIG. 5A depicts a top surface of a control element 116 and FIG. 5B depicts a bottom surface of a support element 118, analogous to the control element 16 and the support element 18 depicted in FIGS. 3A and 3B, except that the control element 116 and the support element 118 are components for providing a multi-function controller in which rotational movement of a control element is detected incrementally (as opposed to rotational movement being detected absolutely, as in the embodiment depicted in FIGS. 1-4). The control element 116 comprises bores 121, detent engaging elements 122, and a plurality of occluders 126. The support element 118 comprises detents 120, a single light emitter 124 and two light receivers 125a and 125b.

In some rotational positions of the support element 118 depicted in FIG. 5B relative to the control element 116 depicted in FIG. 5A, one of the occluders 126 is between the first light emitter 124 and a first of the two light receivers 125a, whereby most or all light emitted by the first light emitter 124 is not received by the first light receiver 125a and light is received (e.g., a much higher quantity of lumens) by the second light receiver 125b (so the first light receiver 125a generates a "0" signal in a binary sense and the second light receiver 125b generates a "1" signal in a binary sense, and so the composite binary signal is 01); in other rotational positions of the support element 118 relative to the control element 116, one of the occluders 126 is between the first light emitter 124 and the second light receiver 125b, whereby most or all light emitted by the first light emitter 124 is not received by the second light receiver 125b and light is received (e.g., a much higher quantity of lumens) by the first light receiver 125b (so the first light receiver 125a generates a "1" signal and the second light receiver 125b generates a "0" signal, whereby the composite binary signal is 10); and in other rotational positions of the support element 118 relative to the control element 116, none of the occluders 126 is between the first light emitter 124 and either of the light receivers 125a and 125b (so both the first light receiver 125a and the second light receiver 125b generate a "1" signal, whereby the composite binary signal is 11). As a result, rotation of the support element 118 relative to the control element 116 is detected incrementally, i.e., upon each incremental rotational movement of the support element 118 relative to the control element 116, the composite binary signal changes, and incremental changes from 01 to 10 and 10 to 11 signify rotation in a first direction (clockwise) while incremental changes from 11 to 10 and 10 to 01 signify rotation in a second direction (counter-clockwise). Other structure for detecting rotation incrementally can be used, e.g., using light of differing color emission and sensors that detect light within different wavelength ranges.

In the embodiment depicted in FIGS. 1-4, or in an embodiment depicted in FIGS. 1-4 but with components depicted in FIGS. 5A and 5B substituted for corresponding components in the embodiment depicted in FIGS. 1-4, or in any other embodiment, including or not including any combination of the modifications described above, the control element 16 can also be tiltable, to allow for more unique signals to be generated, i.e., to provide more actions or combinations of actions that can be detected, e.g., a specific pushbutton pressed, control element rotated to a specific rotational position (or rotated a specific number of positions in one direction or the other), control element tilted in a specific direction, control element pressed down (or pulled up) to enter the selection identified by such combination of actions. In one embodiment, for example, a control element 16 can be tilted (from an upright orientation) in any of four directions (from the perspective of a user looking down on the control element, i.e., along an axis of the control element, tilt down, tilt up, tilt right, tilt left). Alternatively, any different desired number of tilt directions can be provided, and/or the tilt directions can be in any desired directions.

FIG. 6 is an exploded view of components that can be used in an embodiment of a multi-function controller in which a control element is tiltable (from an upright orientation) in any of four directions. FIG. 6 depicts a housing 212, a control element 216, a first tilt member 233, a second tilt member 234, four tilt actuators 235, a carbon pill mat 236, and a circuit board 237 (the tilt actuators 235, the carbon pill mat 236 and the circuit board 237, discussed below, are in the bottom of the housing 212, beneath the tilt members-receiving section 240 (discussed below) of the housing 212, despite being displayed in FIG. 6 beneath the housing).

The first tilt member 233 comprises a pair of first tilt member openings 238 and a pair of first tilt member protrusions 239 positioned about 90 degrees from each other relative to an axis 217 of the control element 216. The housing 212 has a tilt members-receiving section 240 that is shaped to accommodate the first tilt member 233 and the second tilt member 234 and to provide space for the first tilt member 233 to rock side-to-side relative to the housing 212, and for the second tilt member 234 to rock forward and backward relative to the housing 212. The housing 212 has recesses (not visible in FIG. 6) in which the first tilt member protrusions 239 securely fit to facilitate the rocking of the first tilt member 233 (i.e., to rotate relative to an axis of the first tilt member protrusions 239. The second tilt member 234 has a cylindrical opening 241 (through which the control element 216 extends), second tilt member protrusions 242 and second tilt member nose elements 243 (which are received in corresponding nose element-receiving spaces in the tilt members-receiving section 240 of the housing 212. The second tilt member protrusions 242 are securely received in the first tilt member openings 238 to facilitate the rocking of the second tilt member 234 (i.e., to rotate relative to an axis of the second tilt member protrusions 242).

In the components depicted in FIG. 6, or in any embodiment that comprises tilting functionality, any openings (as mentioned above) can instead be recesses that correspond to the protrusions, as desired (or vice-versa), and any openings (or recesses) and protrusions can be of any suitable shape, e.g., any shape that comprises circular cross-sections, e.g., conical, tapered, etc., instead of cylindrical. Any such structures can comprise one (or more) region that has a slightly larger (or smaller) cross-section that an adjacent region or regions, in order to structurally enhance engagement of protrusions in openings (or recesses).

The tilting functionality with the components depicted in FIG. 6 functions in the following way. When the control element 216 is tilted in one of the four tilt directions, a portion of the corresponding second tilt member nose elements 243 (i.e., the second tilt member nose elements 243 on the side of the second tilt member 234 toward which the control element 216 is tilted) presses down on one end of the corresponding tilt actuators 235 (i.e., the tilt actuators 235 on the side toward which the control element 216 is tilted, and the other end of that tilt actuators 235 presses down on one or more carbon pills in the carbon pill mat 236 associated with (i.e., below) that tilt actuators 235, and that carbon pill (or each of those carbon pills) is in turn pushed toward the circuit board 237 and provides an electrically conductive bridge between two or more electrically conductive portions on the circuit board 237, thereby providing an electronic signal indicating that the control element 216 has been tilted in a particular direction. Optionally, one or more components (e.g., one or more springs, or a snug-fitting resilient collar) can be included to cause the control element 216 to return to its upright position when the force that caused the control element 216 to tilt is removed.

As noted above, the components depicted in FIG. 6 provide for four tilt directions. Any desired number of tilt directions can instead be provided, and such tilt directions can be oriented in any desired directions.

The components depicted in FIG. 6 provide tilting functionality in a particular way, but from the present description, persons of skill in the art can recognize a variety of other ways to provide the tilt functionality. One alternative way is depicted in FIG. 7, which depicts components of a multi-function controller that can be used to provide tilt functionality.

Figure 7:
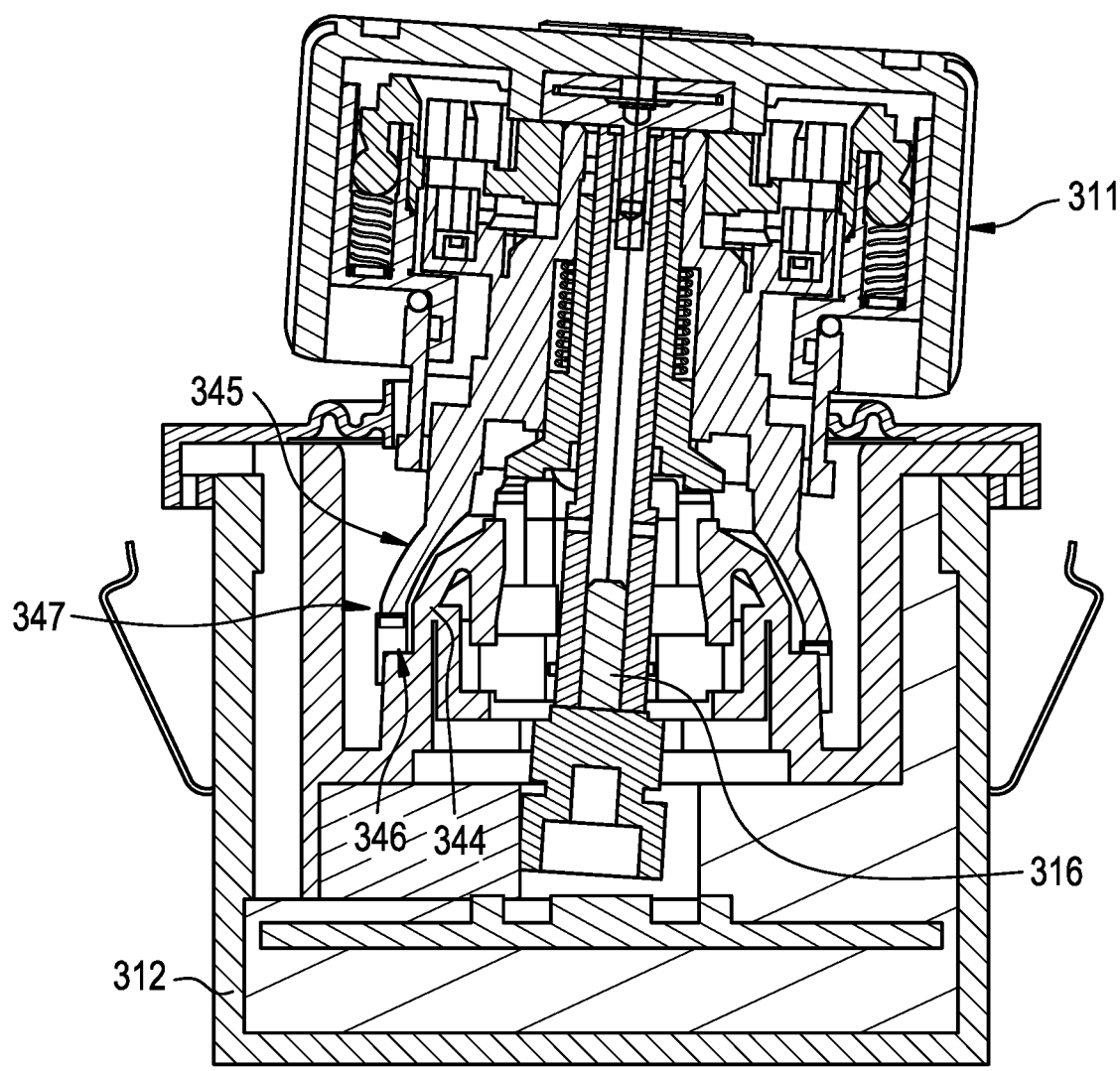
FIG. 7 is a perspective view of components in some embodiments of a multi-function controller in accordance with the present inventive subject matter.

FIG. 7 depicts a housing 312, a control element 316 and a handle element 311. Connected to the housing 312 is a tilt-enabling structure 344, and connected to the handle element 311 is a tilt-enabling structure-receiving structure 345. The tilt-enabling structure 344 and the tilt-enabling structure-receiving structure 345 are shaped to enable the handle element 311 to tilt relative to the housing 312. The tilt-enabling structure-receiving structure 345 has a stop region 346 which is engaged by an end region 347 on the tilt-enabling structure 344 when the handle element 311 is tilted as far as necessary (or beyond where necessary) to generate a tilt signal. A carbon pill mat and a circuit board (or any other suitable arrangement) can be provided to generate an electronic signal upon the control element 316 being tilted in a tilt direction to a sufficient extent, e.g., the carbon pill mat and the circuit board being arranged in a manner analogous to the way the carbon pill mat 236 and the circuit board 237 are arranged in FIG. 6.

The tilt-enabling structure 344 and the tilt-enabling structure-receiving structure 345 depicted in FIG. 7 have specific shapes. Tilt functionality can be provided in an analogous way with structures of different shapes than the specific shapes of the tilt-enabling structure 344 and the tilt-enabling structure-receiving structure 345, and from the present description, persons of skill in the art would readily be able to provide such structures.

Multi-function controllers in accordance with the present inventive subject matter can include a viewing screen, or can interface with a viewing screen in any desired way. FIG. 8 schematically depicts a representative example of a viewing screen 448 that can be incorporated in or interfaced with a multi-function controller in accordance with the present inventive subject matter.

A viewing screen (when employed) can display any suitable information generated by operation of a multi-function controller in accordance with the present inventive subject matter. For example, in some embodiments, a unique screen can be displayed on a viewing screen for each pushbutton (or for any pushbuttons on the multi-function controller), and a cursor on such screen (or screens) can be moved on such screen(s) in response to tilting of a handle element (and/or in response to rotation of a handle element). For example, signals generated by tilting a handle element can cause movement of a cursor in a corresponding direction (and/or holding a handle element in a tilted orientation can cause continuous movement, e.g., incremental movement with a time span for each jump, in a corresponding direction). Tilting of a handle element can alternatively or additionally be used to navigate among different screens (i.e., different images covering the screen). Similarly, rotation of a handle element can be used to move a curso in a specific way and/or or to navigate among different screens. Pressing down on a handle element (and/or pulling up on a handle element) can also cause specific activity on a viewing screen, e.g., selection of an option (shown on a portion of a viewing screen) on which the cursor is located, moving the cursor, and/or navigating among screens, etc.

In any multi-function controller in accordance with the present inventive subject matter, rotation of a control element relative to a housing (and optionally relative to other components, such as an icon cap) can be provided in the manner depicted in the embodiment shown in FIGS. 1-4. Alternatively, in any multi-function controller in accordance with the present inventive subject matter, such rotation of a control element can be provided in any other suitable manner, e.g., with components as depicted in FIG. 9. FIG. 9 schematically depicts a cross-sectional view of a control element 516, three planet gears 549 and a sun gear 550. The sun gear 550 is rigidly (i.e., non-rotatably) connected to a housing, and the control element 516 is connected to a handle element. The control element 516 has teeth that engage with the teeth on the planet gears 549, and the teeth on the planet gears 549 also engage with teeth on the sun gear 550, thereby providing a planetary gear arrangement (i.e., including the control element 516 functioning as the ring gear, the planet gears 549 and the sun gear 550), such that upon rotating the handle element relative to the housing, the control element 516 will rotate relative to the housing, the planet gears 549 will rotate (relative to their respective axes) relative to the housing, and the sun gear 550 will remain stationary (relative to the housing).

FIG. 10 depicts components that can be included in a multi-function controller in accordance with the present inventive subject matter to provide a multi-function controller in which a control element can be rotated, tilted and pushed in, and each of such motions can be detected (individually or in combination) by a three-dimensional Hall effect sensor.

FIG. 10 depicts a control element 616 which is capable of being rotated, tilted and pushing in, be providing structure as described above for enabling all of such movements. A magnet 651 is connected to a bottom (in the orientation depicted in FIG. 10) end of the control element 616, and a plurality of Hall effect sensors 652 are connected to the housing 612. The Hall effect sensors 652 are arranged relative to each other and relative to the magnet 651 such that each of the Hall effect sensors generates a voltage in response to a magnetic field produced by the magnet, in which for each Hall effect sensor, the voltage generated is dependent upon the positional relationship between the magnet 651 and that specific Hall effect sensor, whereby for each position of the control element 616 (resulting from no movement of the control element 616), or from a combination of one or more movements of the control element 616, a combination of the specific voltages generated by the Hall effect sensors is unique (i.e., there are no two positions of the magnet 651 in which the respective voltages generated by the respective Hall effect sensors are identical), such that the position of the control element 616 can be sensed based on the respective voltages generated by the respective Hall effect sensors. From the description in the present specification, persons of skill in the art would readily be able to provide an arrangement that can provide an electronic signal that indicates the location of the magnet 651.

The embodiment depicted in FIG. 10 comprises a planetary gear system, in the form of a ring gear (comprising teeth 653 on the inside surface of a handle element 611 (which is connected to the control element 616), planet gears 649 and a sun gear 650.

In the components depicted in FIG. 10, the magnet 651 is on the control element 616 and the Hall effect sensors are connected to the housing 612. Alternatively, one or more Hall effect sensors can be mounted on a control element and one or more magnets can be connected to a housing to provide a multi-function controller in which for each position of the control element, a unique combination of voltages is generated by the Hall effect sensors.

Alternatively, in the components depicted in FIG. 10, or in a modified multi-function controller in which one or more Hall effect sensors are mounted on a control element and one or more magnets are connected to a housing, or in any other embodiment, there can be provided more than one magnet and/or only a single Hall effect sensor.

In any multi-function controller in accordance with the present inventive subject matter in which one or more magnets are provided and one or more Hall effect sensors are provided, the reliability and accuracy of the multi-function controller can be enhanced by making the components of the multi-function controller more precise, i.e., such that the positioning of a control element, the one or more magnet and the one or more Hall effect sensors cannot deviate significantly from the positions designed for those components (e.g., the control element does not experience an appreciable amount of wiggle, regardless of the forces that might act on the multi-function controller and/or the system in which it is integrated). In addition, or alternatively, greater reliability and/or accuracy can be provided by including a greater number of Hall effect sensors and/or a greater number of magnets, located at different positions and/or at different rotational angles relative to one another, to increase the differentiation among signals generated when a control element is in different rotational positions, tilt orientations and/or axial displacements.

In another aspect, the present inventive subject matter provides embodiments of multi-function controllers that can be reliably protected from ingress of undesirable materials (e.g., dust, water, dirt, etc.) with components that do not require intricate fabrication.

In any of the multi-function controllers discussed above, or in any other multi-function controller in accordance with the present inventive subject matter, one or more LEDs can be provided as indicator lights and/or to illuminate one or more features on the multi-function controller. For example, one or more LEDs can be provided on each pushbutton (if included) to indicate the status of each pushbutton (e.g., the pushbutton has been pressed, the pushbutton has not been pressed, the pushbutton has been pressed twice, etc.). One or more LEDs can be provided to illuminate the pushbuttons (e.g., by backlighting and/or by directing light toward the pushbuttons). One or more LEDs can be provided to indicate the rotational position of a handle element (and/or a control element). One or more LEDs can be provided to illuminate a handle element (e.g., by backlighting and/or by directing light toward the handle element). One or more LEDs can be provided to illuminate an icon cap (e.g., by backlighting and/or by directing light toward the icon cap). Any LED (or combination of LEDs) can emit light of a particular color, whereby any specific selection or mode of operation of a multi-function controller can be signaled by light of a particular color being emitted.

In any embodiment that is described herein as having one or more LEDs, any of such LEDs can instead comprise any other light emitter, as desired.

FIG. 11 depicts another embodiment of a multi-function controller in accordance with the present inventive subject matter. The multi-function controller depicted in FIG. 11 comprises a rotatable handle element 711, a housing 712, a flexible mat 719 that comprises four pushbuttons 713, an icon cap 714 (visible through a transparent circular lens 715 centered relative to the handle element 711 within a peripheral region of the handle element 711). The handle element 711 is rotatable among a plurality of rotational positions which are incrementally sensed optically (through the provision of a light emitter/light receiver pair and a plurality of occluders), and/or the rotational positions are detected with the use of a potentiometer (e.g., by providing a fixed contact and a movable contact electrically connected to a rheostat). The handle element 711 can be pushed downward (i.e., toward the flexible mat 719), and it moves back up after the force that causes it to move downward is released. The handle element 711 in this embodiment is not tiltable. Some or all of the pushbuttons 713 include indicia 755 representing the function (or one or more of the functions) controlled by that pushbutton 713. Some or all of the pushbuttons 754 include one or more LED indicator lights 754.

As noted above, in one aspect, the present inventive subject matter is directed to a multi-function controller that is effectively sealed so as to be suitable for use in harsh industrial environments, and resistant to water, dust, dirt, etc., and combinations of such conditions and events. In some embodiments, the components of the multi-function controller are shaped so as to be reliably sealed, and in some cases with seal components that are of non-complicated shapes. FIG. 12 depicts representative components of a sealed multi-function controller in accordance with the present inventive subject matter. Referring to FIG. 12, there are shown components including a handle element 811, a housing 812, a silicone mat lip seal 856, a silicone mat boot seal 857, and a silicone mat V-seal 858. Due to the shapes of the various components of the multi-function controller depicted in FIG. 12 (similar to components in other multi-function controllers depicted herein):

the silicone mat boot seal 857 is of a relatively simple construction, including a boot shape (which is effective for accommodating tilting of the handle element 811) having a circular hole through which the handle element protrudes;

the silicone mat V-seal 858 is of a relatively simple construction, namely, substantially cylindrical (to cover the handle element 811), with a V-shaped end that securely engages a corresponding V-shaped end (oriented in the opposite direction) in the silicone mat boot seal 857, which is effective for accommodating rotation of the handle element 811 (along with the silicone mat V-seal 858) relative to the housing 812 (and rotation of the silicone mat V-seal 858 relative to the silicone mat boot seal 857); and the silicone mat lip seal 856 is of relatively simple construction, and securely engages a peripheral protrusion on the housing 812.

In some embodiments, one or more O-rings and/or seal collars can be provided in addition to the above-described seals or in place of one or more of the above-described seals, e.g., between a handle element and a housing.

Some embodiments can include all of the seals described herein, and some can include only one or more of the seals described herein, in any suitable combinations.

In some embodiments of multi-function controllers in accordance with the present inventive subject matter, the multi-function controller is protected from ingress of water, dust, dirt, etc. (e.g., is protected against low pressure water jets from any direction, with no or only limited water ingress permitted), satisfying the ingress protection requirements of IP 65 per IEC 60529, and/or is IP 65 rated per the DIN 40050-9 standard.

FIG. 13 is an exploded view of components of another embodiment of a multi-function controller in accordance with the present inventive subject matter. The multi-function controller depicted in FIG. 13 comprises a handle element 911 (in the form of a cap), a housing inner component 912a, a housing lower component 912b, pushbuttons 913, an icon cap 914 (which comprises an icon and a graphic light pipe for illuminating the icon), a lens 915, a control element 916 (in the form of a shaft), a support element 918, a first flexible mat 919 (in the form of a silicone cover), a detent structure 920 (with multiple detents on its underside), a detent engaging elements 922, springs 923, keypad actuators 927, a second flexible mat 928, a printed circuit board 929 (with sensors), a flex cable 959, a first O-ring 960, a second O-ring 961, a snap dome silicone mat 962, a snap dome 963, and threaded inserts 964. In the embodiment depicted in FIG. 13, the handle element 911, the housing (comprising the inner component 912a and the housing lower component 912b), the pushbuttons 913, the icon cap 914, the lens 915, the control element 916, the support element 918, the first flexible mat 919, the detents on the detent structure 920, the detent engaging elements 922, the springs 923, and the keypad actuators 927 perform functions consistent with components of similar name discussed above. The second flexible mat 928 and the snap dome 963 enable the handle element 911 (together with the components within the handle element 911, and the control element 916 to be pressed downward relative to the housing sufficiently for the snap dome 963 to complete an electrical connection between two or more electrically conductive regions, and the snap dome 963 pushes the control element 916 (along with the handle element 911 and the components within) back up after the downward pressing force is removed, in addition to providing a tactile response to assist a user in recognizing that the downward movement of the handle element 911 has been received by the multi-function controller. Light emitters and light receivers are on the underside of the printed circuit board 929, and occluders are provided on the support element 918, whereby the rotational position of the handle element 911 can be detected in an absolute sense. A flex cable 959 provides electrical connections to allow at least for power to be delivered to the light emitters and light receivers, for power to be delivered to the light pipe that illuminates the icon cap, and for signals generated by the light receivers to be conveyed. The first O-ring 960 provides a seal between the detent structure 920 and the support element 918, and the second O-ring provides a seal between the support element 918 and the first flexible mat 919, to enhance resistance to ingress of water, dirt, dust, etc. The snap dome silicone mat 962 is a silicone mat with snap domes associated with each of the keypad actuators 927, whereby pressing of any of the pushbuttons 913 creates a downward force that pushes the respective keypad actuator 927 downward into the snap dome silicone mat 962, causing the snap dome associated with that respective keypad actuator 927 to make an electrical connection indicating that the pushbutton was pressed. The threaded inserts 964 are provided for mounting the multi-function controller in a system or device in which it is being integrated.

FIG. 14 is an exploded view of components of another embodiment of a multi-function controller in accordance with the present inventive subject matter. The multi-function controller depicted in FIG. 14 comprises a handle element 1011 (in the form of a cap), a housing inner component 1012a, a housing lower component 1012b, pushbuttons 1013, an icon cap 1014 (which comprises an icon and a graphic light pipe for illuminating the icon), a lens 1015, a control element 1016 (in the form of a shaft), a support element 1018, a first flexible mat 1019 (in the form of a silicone cover), a detent structure 1020 (with multiple detents on its underside), a detent engaging elements 1022 (in the form of spring plungers), keypad actuators 1027, a printed circuit board 1029 (with sensors), a flex cable 1059, a first O-ring 1060, a second O-ring 1061, a snap dome silicone mat 1062, a snap dome 1063, and threaded inserts 1064. In the embodiment depicted in FIG. 14, the handle element 1011, the housing inner component 1012a, the housing lower component 1012b, the pushbuttons 1013, the icon cap 1014, the lens 1015, the control element 1016, the support element 1018, the first flexible mat 1019, the detent structure 1020, the detent engaging elements 1022, the keypad actuators 1027, the printed circuit board 1029, the flex cable 1059, the first O-ring 1060, the second O-ring 1061, the snap dome silicone mat 1062, the snap dome 1063, and the threaded inserts 1064 perform functions consistent with components of similar name in the embodiment depicted in FIG. 13.

The multi-function controller depicted in FIG. 14 further comprises a first tilt member 1033, a second tilt member 1034, tilt actuators 1035, a carbon pill mat 1036, and a circuit board 1037, each of which performs functions consistent with components of similar name in the embodiment depicted in FIG. 6.

The multi-function controller depicted in FIG. 14 further comprises four tilting snap domes 1065 (each associated with one of the four directions in which the control element 1016 can be tilted). The tilting snap domes 1065 are optional, and are provided in this embodiment to increase the haptic snap feeling of the tilting. The control element 1016 is returned to its upright orientation after a tilting force is removed by way of the carbon pill silicone mat 1036.

In the multi-function controller depicted in FIG. 14, a light emitter and a pair of light receivers are on the underside of the printed circuit board 1029, and occluders are provided on the support element 1018, whereby the rotational position of the handle element 1011 can be detected in an incremental sense. The multi-function controller depicted in FIG. 14 thus provides a handle element that can be rotated clockwise or counterclockwise incrementally, tilted in any of four directions, and pushed downward.

Information detected by and/or produced by the multi-function controllers in accordance with the present inventive subject matter (e.g., selections made using the controls in the multi-function controllers) can be communicated to sub-systems within the system in which the multi-function controllers are integrated in any suitable way and with any suitable components. One representative example of a suitable sub-system to transmit, receive and/or store such information (and optionally other information, e.g., information generated by or detected by components within the system and not within the multi-function controller) comprises a J1939 (SAE J1939) vehicle bus providing multiple bus and gateway capability. With the description in the present specification, persons of skill in the art can readily incorporate such communications in a system. In some embodiments of multi-function controllers in accordance with the present inventive subject matter, there may be provided a high level communications protocol that assigns a unique identifier to each message transmitted on one or more buses.

In some embodiments of multi-function controllers in accordance with the present inventive subject matter, there may be provided a communications control stack including a processor running a high level communications protocol the can provide multiple bus and gateway capability.

In some embodiments of multi-function controllers in accordance with the present inventive subject matter, there can be provided a communications control stack that operates on at least a controller area network (CAN) bus. A controller area network (CAN) bus can comprise a multiple master bus configuration in which each node includes a microcontroller for running a message-based protocol for communications between microcontrollers and devices in applications without a designated host computer, e.g., a CAN bus can comprise a two layer structure with additional layers implemented in software, and/or a CAN protocol can be a multi-layered networking protocol that includes more than one of the following abstraction layers: an application layer, an object layer, a transfer layer, and a physical layer.

In another aspect of the present inventive subject matter, some or all of the components in different embodiments of multi-function controllers can be interchanged, whereby the multi-function controllers have significant modularity.

The various components in the multi-function controllers in accordance with the present inventive subject matter can be made of a variety of materials (or combinations of materials), as desired. For example, different components can be made of resilient material (e.g., silicone), plastics, metals, alloys, etc. With the description in the present specification, persons of skill in the art can readily select suitable materials for the various components (in light of the functions to be provided by such components), and multi-function controllers with components made of all such materials (and/or combinations of materials) are included within the scope of the present inventive subject matter.

In the discussions of various components, reference has been made herein to carbon pill mats that selectively provide electrically conductive bridges between two or more electrically conductive portions on a circuit board. Other ways of converting movement of a component (e.g., a tilt actuator or a tilt-enabling structure-receiving structure) into an electronic signal can be employed instead of any of all carbon pill mats. For example, from the present description, persons of skill in the art would readily be able to employ snap domes (e.g., an array of snap domes) or metal contact switches instead (or in addition).

The present inventive subject matter is also directed to methods of controlling systems. Such methods can comprise (1) moving a handle element and/or a control element rotationally, and/or (2) tilting a handle element and/or a control element, and/or (3) moving a handle element and/or a control element substantially axially, and/or (4) pressing one or more pushbuttons, in any sequences or combinations. Such methods can further comprise thereby generating one or more electronic signals indicative of a rotational position of a control element, one or more electrical signals indicative of rotational movement of a control element, one or more electrical signals indicative of tilting a control element in a particular direction, one or more electrical signals indicative of pushing or pulling a control element, one or more electrical signals indicative of pressing one or more pushbuttons one time or more, and combinations of any such actions.

While certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Each component described herein can be a unitary one-piece structure. In some cases, if suitable, two or more structural parts of the devices described herein can be integrated, and/or a component can be provided in two or more parts (which are held together, if necessary). Similarly, any two or more functions can be conducted simultaneously, and/or any function can be conducted in a series of steps.

The invention claimed is:

1. A multi-function controller, comprising:
a control element,
a support element,
a plurality of light emitters, comprising at least a first light emitter, a second light emitter and a third light emitter,
a plurality of light receivers comprising at least a first light receiver, a second light receiver and a third light receiver, and
at least a first occluder and a second occluder,
the control element comprising a control element first surface,
the support element comprising a support element first surface,
the control element first surface facing the support element first surface,
the control element is rotatable relative to the support element about a first axis to at least five different rotational positions, including a first rotational position, a second rotational position, a third rotational position, a fourth rotational position and a fifth rotational position,
the plurality of light emitters and the plurality of light receivers are on the support element first surface, the first occluder is on the control element first surface,
a light emitting surface of the first light emitter facing a light receiving surface of the first light receiver,
a light emitting surface of the second light emitter facing a light receiving surface of the second light receiver,
the first light emitter, the first light receiver and the first occluder are configured and positioned such that:
with the control element in the first rotational position and the first light emitter emitting light of a first brightness, the first light receiver receives a first percentage of the light emitted by the first light emitter,
with the control element in the second rotational position and the first light emitter emitting light of the first brightness, the first light receiver receives a second percentage of the light emitted by the first light emitter, the second percentage of light different from the first percentage of light,
with the control element in the first rotational position, no portion of the first occluder is between the first light emitter and the first light receiver, and
with the control element in the second rotational position, at least a portion of the first occluder is between the first light emitter and the first light receiver,
the first, second and third light emitters, the first, second and third light receivers and the first and second occluders are positioned relative to one another in an arrangement, the arrangement is non-symmetrical, such that by virtue of the arrangement of the first, second and third light emitters, the first, second and third light receivers and the first and second occluders:
at least one light receiver that does not receive light of a brightness above a threshold brightness in the first rotational position receives light of a brightness above the threshold brightness in the second rotational position;
at least one light receiver that does not receive light of a brightness above the threshold brightness in the first rotational position receives light of a brightness above the threshold brightness in the third rotational position;
at least one light receiver that does not receive light of a brightness above the threshold brightness in the first rotational position receives light of a brightness above the threshold brightness in the fourth rotational position;
at least one light receiver that does not receive light of a brightness above the threshold brightness in the first rotational position receives light of a brightness above the threshold brightness in the fifth rotational position;
at least one light receiver that does not receive light of a brightness above the threshold brightness in the second rotational position receives light of a brightness above the threshold brightness in the third rotational position;
at least one light receiver that does not receive light of a brightness above the threshold brightness in the second rotational position receives light of a brightness above the threshold brightness in the fourth rotational position;
at least one light receiver that does not receive light of a brightness above the threshold brightness in the second rotational position receives light of a brightness above the threshold brightness in the fifth rotational position;
at least one light receiver that does not receive light of a brightness above the threshold brightness in the third rotational position receives light of a brightness above the threshold brightness in the fourth rotational position;
at least one light receiver that does not receive light of a brightness above the threshold brightness in the third rotational position receives light of a brightness above the threshold brightness in the fifth rotational position; and
at least one light receiver that does not receive light of a brightness above the threshold brightness in the fourth rotational position receives light of a brightness above the threshold brightness in the fifth rotational position.

2. A multi-function controller, comprising:
a control element,
a support element,
a plurality of light emitters, comprising at least a first light emitter, a second light emitter and a third light emitter, a plurality of light receivers comprising at least a first light receiver, a second light receiver and a third light receiver, and at least a first occluder, the control element comprising a control element first surface, the support element comprising a support element first surface, the control element first surface facing the support element first surface, the control element is rotatable relative to the support element about a first axis to at least a first rotational position, a second rotational position and a third rotational position, the plurality of light emitters and the plurality of light receivers are on the support element first surface, the first occluder is on the control element first surface, a light emitting surface of the first light emitter facing a light receiving surface of the first light receiver, a light emitting surface of the second light emitter facing a light receiving surface of the second light receiver, the first light emitter, the first light receiver and the first occluder are configured and positioned such that:

with the control element in the first rotational position and the first light emitter emitting light of a first brightness, the first light receiver receives a first percentage of the light emitted by the first light emitter, with the control element in the second rotational position and the first light emitter emitting light of the first brightness, the first light receiver receives a second percentage of the light emitted by the first light emitter, the second percentage of light different from the first percentage of light, with the control element in the first rotational position, no portion of the first occluder is between the first light emitter and the first light receiver, and with the control element in the second rotational position, at least a portion of the first occluder is between the first light emitter and the first light receiver, the second rotational position is rotationally adjacent to the first rotational position, rotating the control element clockwise from the first rotational position to a next adjacent clockwise rotational position moves the control element to the second rotational position, rotating the control element counter-clockwise from the first rotational position to a next adjacent counter-clockwise rotational position moves the control element to the third rotational position, the first, second and third light emitters, the first, second and third light receivers and the first and second occluders are positioned relative to one another in an arrangement, the arrangement is non-symmetrical, such that by virtue of the arrangement of the first, second and third light emitters, the first, second and third light receivers and the first and second occluders:

at least one light receiver that does not receive light of a brightness above a threshold brightness in the first rotational position receives light of a brightness above the threshold brightness in the second rotational position, and/or at least one light receiver that receives light of a brightness above a threshold brightness in the first rotational position does not receive light of a brightness above the threshold brightness in the second rotational position;

at least one light receiver that does not receive light of a brightness above a threshold brightness in the first rotational position receives light of a brightness above the threshold brightness in the third rotational position, and/or at least one light receiver that receives light of a brightness above a threshold brightness in the first rotational position does not receive light of a brightness above the threshold brightness in the third rotational position; and at least one light receiver that does not receive light of a brightness above a threshold brightness in the second rotational position receives light of a brightness above the threshold brightness in the third rotational position, and/or at least one light receiver that receives light of a brightness above a threshold brightness in the third rotational position does not receive light of a brightness above the threshold brightness in the second rotational position.

3. A multi-function controller as recited in claim 1, wherein:

the multi-function controller further comprises a handle element, an icon cap and a plurality of gears, and the plurality of gears is configured such that rotation of the handle element relative to the first axis causes the control element to rotate and does not cause the icon cap to rotate.

4. A multi-function controller as recited in claim 1, wherein:

the first light emitter is substantially aligned with the first light receiver, the second light emitter is substantially aligned with the second light receiver, and the third light emitter is substantially aligned with the third light receiver.

5. A multi-function controller as recited in claim 1, wherein:

with the control element in the second rotational position, the first light occluder substantially blocks light emitted by the first light emitter from reaching the first light receiver.

6. A multi-function controller as recited in claim 1, wherein:

the control element is movable along the first axis among at least first and second axial positions, and a sensor detects whether the control element is in the second axial position.

7. A multi-function controller as recited in claim 1, wherein:

the controller further comprises at least a first sensor, the control element is movable along the first axis among at least first and second axial positions, and the first sensor detects whether the control element is in the second axial position.

8. A multi-function controller as recited in claim 7, wherein:

the multi-function controller further comprises a second sensor, and the second sensor detects whether the control element is in the second axial position.

9. A multi-function controller as recited in claim 1, wherein:

the multi-function controller further comprises at least a first magnet and at least a first sensor, the control element is tiltable relative to the first axis among at least two tilt orientations, one of the first magnet and the first sensor is connected to the control element, the other of the first magnet and the first sensor not connected to the control element, and the first sensor is configured to detect a tilt orientation of the control element.

10. A multi-function controller as recited in claim 9, wherein the first sensor is a three-dimensional Hall effect sensor.

11. A multi-function controller as recited in claim 9, wherein:

the first magnet is connected to the control element, and
the first sensor is not connected to the control element.

12. A multi-function controller as recited in claim 11, wherein:

the multi-function controller further comprises a housing,
the control element is rotatable relative to the housing and tiltable relative to the housing, and
the first sensor is connected to the housing.

13. A multi-function controller as recited in claim 9, wherein:

the first magnet is not connected to the control element, and
the first sensor is connected to the control element.

14. A multi-function controller as recited in claim 13, wherein:

the multi-function controller further comprises a housing,
the control element is rotatable relative to the housing and tiltable relative to the housing, and the first magnet is connected to the housing.

15. A multi-function controller as recited in claim 9, wherein:

the control element is movable along the first axis among at least first and second axial positions, and
the first sensor detects whether the control element is in the second axial position.

16. A multi-function controller as recited in claim 2, wherein:

the multi-function controller further comprises a handle element, an icon cap and a plurality of gears, and
the plurality of gears is configured such that rotation of the handle element relative to the first axis causes the control element to rotate and does not cause the icon cap to rotate.

17. A multi-function controller as recited in claim 2, wherein:

with the control element in the second rotational position, the first light occlude substantially blocks light emitted by the first light emitter from reaching the first light receiver.

18. A multi-function controller as recited in claim 2, wherein:

the control element is movable along the first axis among at least first and second axial positions, and
a sensor detects whether the control element is in the second axial position.

19. A multi-function controller as recited in claim 2, wherein:

the controller further comprises at least a first sensor,
the control element is movable along the first axis among at least first and second axial positions, and
the first sensor detects whether the control element is in the second axial position.

20. A multi-function controller as recited in claim 19, wherein:

the multi-function controller further comprises a second sensor, and
the second sensor detects whether the control element is in the second axial position.

21. A multi-function controller as recited in claim 2, wherein:

the multi-function controller further comprises at least a first magnet and at least a first sensor,
the control element is tiltable relative to the first axis among at least two tilt orientations,
one of the first magnet and the first sensor is connected to the control element, the other of the first magnet and the first sensor not connected to the control element, and
the first sensor is configured to detect a tilt orientation of the control element.

22. A multi-function controller as recited in claim 21, wherein the first sensor is a three-dimensional Hall effect sensor.

23. A multi-function controller as recited in claim 21, wherein:

the first magnet is connected to the control element, and
the first sensor is not connected to the control element.

24. A multi-function controller as recited in claim 23, wherein:

the multi-function controller further comprises a housing,
the control element is rotatable relative to the housing and tiltable relative to the housing, and
the first sensor is connected to the housing.

25. A multi-function controller as recited in claim 21, wherein:

the first magnet is not connected to the control element, and
the first sensor is connected to the control element.

26. A multi-function controller as recited in claim 25, wherein:

the multi-function controller further comprises a housing,
the control element is rotatable relative to the housing and tiltable relative to the housing, and
the first magnet is connected to the housing.

27. A multi-function controller as recited in claim 21, wherein:

the control element is movable along the first axis among at least first and second axial positions, and
the first sensor detects whether the control element is in the second axial position.

* * * * *